(12) United States Patent
Kishi

(10) Patent No.: US 8,340,441 B2
(45) Date of Patent: Dec. 25, 2012

(54) IMAGE ENCODING APPARATUS, IMAGE DECODING APPARATUS, AND METHODS OF CONTROLLING THE SAME

(75) Inventor: Hiroki Kishi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 12/555,115

(22) Filed: Sep. 8, 2009

(65) Prior Publication Data

US 2010/0067810 A1 Mar. 18, 2010

(30) Foreign Application Priority Data

Sep. 17, 2008 (JP) ................................ 2008-238391

(51) Int. Cl.
*G06K 9/36* (2006.01)
(52) U.S. Cl. ...................................... 382/232
(58) Field of Classification Search ........... 382/232–253
See application file for complete search history.

(56) References Cited

U.S. PATENT DOCUMENTS

| | | | |
|---|---|---|---|
| 6,006,231 A | 12/1999 | Popa | |
| 6,591,017 B1 * | 7/2003 | Fukuhara et al. | 382/240 |
| 6,690,724 B1 | 2/2004 | Kadono | 375/240.01 |
| 6,847,735 B2 | 1/2005 | Kajiwara et al. | 382/233 |
| 6,879,726 B2 | 4/2005 | Sato et al. | 382/239 |
| 6,879,727 B2 | 4/2005 | Sato et al. | 382/239 |
| 6,917,716 B2 | 7/2005 | Kajiwara et al. | 382/240 |
| 6,947,600 B1 | 9/2005 | Sato et al. | 382/233 |
| 6,950,471 B2 | 9/2005 | Kishi | 375/240.19 |
| 6,993,198 B2 | 1/2006 | Kishi | 382/240 |
| 7,305,139 B2 | 12/2007 | Srinivasan et al. | 382/248 |
| 7,428,342 B2 | 9/2008 | Tu et al. | 382/248 |
| 7,499,592 B2 | 3/2009 | Nakayama et al. | 382/233 |
| 7,574,063 B2 | 8/2009 | Kajiwara et al. | 382/239 |
| 2006/0045466 A1 | 3/2006 | Sasaki et al. | |
| 2007/0127826 A1 | 6/2007 | Kishi | 382/232 |
| 2007/0160299 A1 | 7/2007 | Kajiwara et al. | 382/240 |
| 2007/0286478 A1 | 12/2007 | Kishi | 382/162 |
| 2008/0089413 A1 | 4/2008 | Kishi et al. | 375/240.13 |
| 2008/0317368 A1 | 12/2008 | Tu et al. | 382/248 |
| 2009/0252232 A1 | 10/2009 | Kishi et al. | 375/240.24 |
| 2009/0252427 A1 | 10/2009 | Kishi et al. | 372/244 |

FOREIGN PATENT DOCUMENTS

CN 101030365 9/2007
(Continued)

OTHER PUBLICATIONS

European Search Report dated Sep. 20, 2011 in corresponding European Patent Application No. 09169998.3.
(Continued)

*Primary Examiner* — Alex Liew
(74) *Attorney, Agent, or Firm* — Fitzpatrick, Cella, Harper & Scinto

(57) ABSTRACT

This invention enables the suppression of block noise even at an intermediate resolution equal to or lower than the original resolution and further increases the number of directly decodable resolutions for higher convenience. For this purpose, a memory stores original image data photographed by an image sensing unit. A resizing unit generates resized image data by reducing the numbers of horizontal and vertical pixels of the original image data stored in the memory to ½ and stores the image data in the memory again. An image compression unit encodes the original image data and the resized image data by HD Photo®. A CPU puts the two encoded data into one file and stores it in a nonvolatile memory card connected to an output unit.

13 Claims, 31 Drawing Sheets

FOREIGN PATENT DOCUMENTS

| | | |
|---|---|---|
| DE | 102005032702 A1 | 1/2007 |
| EP | 1480196 A2 | 11/2004 |
| JP | 2006-197573 A | 7/2006 |
| KR | 10-0341079 | 6/2002 |

OTHER PUBLICATIONS

Srinivasan, S., et al., HD Photo: A New Image Coding Technology for Digital Photography, Proc. of SPIE, 2007, vol. 6696.

Tiff, Revision 6.0, Adobe Developers Association, 1992, pp. 1-121, XP-002328630.

European Office Action dated May 15, 2012 in counterpart European Patent Application No. 09169998.3.

Vetro A et al.: "On the Motion Compensation Within a Down-Conversion Decoder", Journal of Electronic Imaging, SPIE/IS&T, vol. 7, No. 3, Jul. 1, 1998, pp. 616-627, XP000771768.

English Translation of Notification of First Office Action dated Sep. 21, 2011 in counterpart Chinese Patent Application No. 200910174764.1.

\* cited by examiner

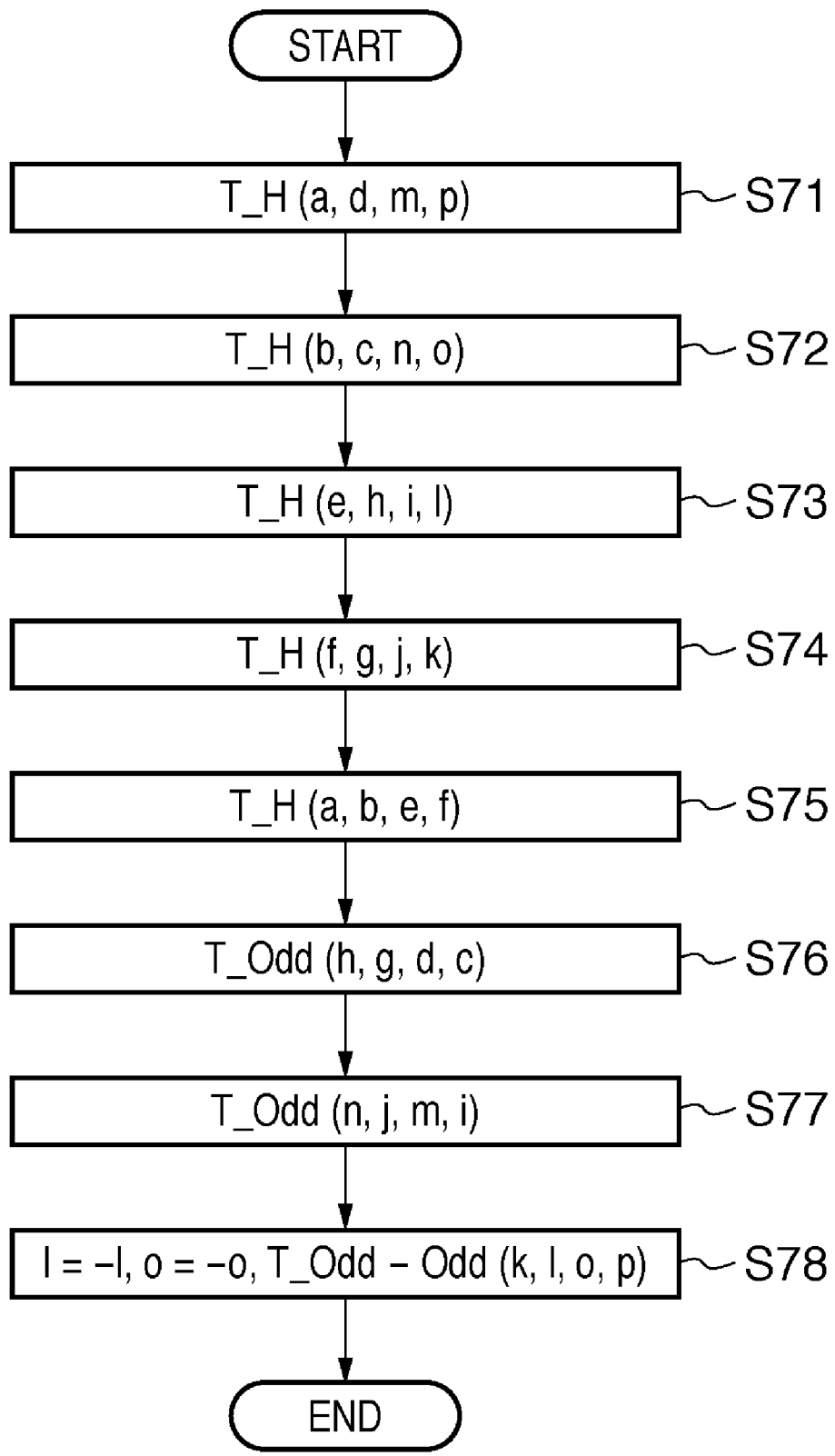

| a | b | c | d |
| --- | --- | --- | --- |
| e | f | g | h |
| i | j | k | l |
| m | n | o | p |

BLOCK

T_H (X1, X2, X3, X4)

T_Odd (X1, X2, X3, X4)

T_Odd – Odd (X1, X2, X3, X4)

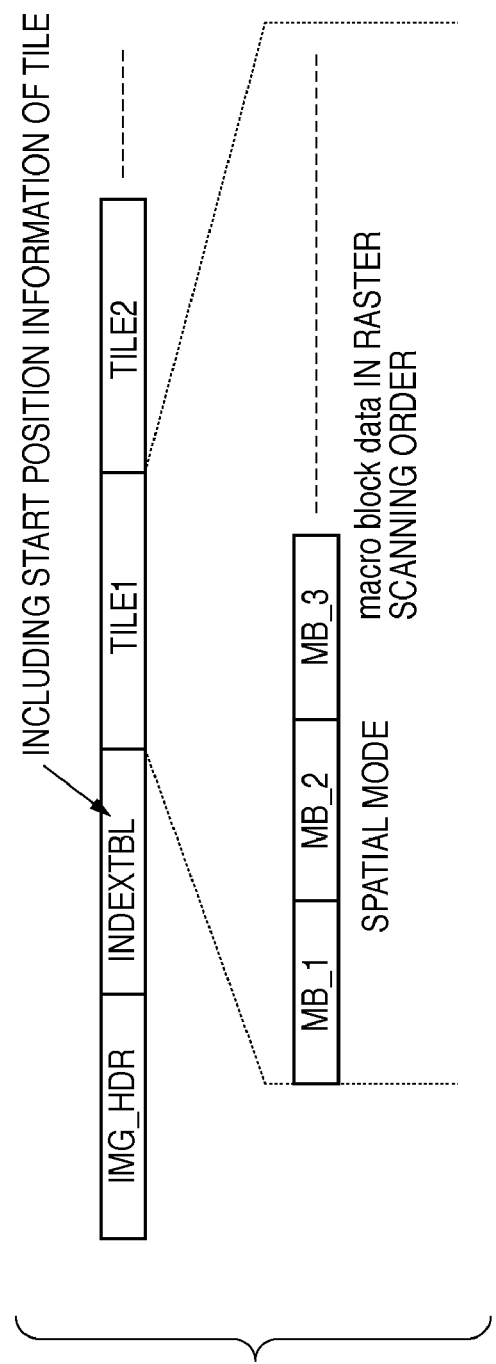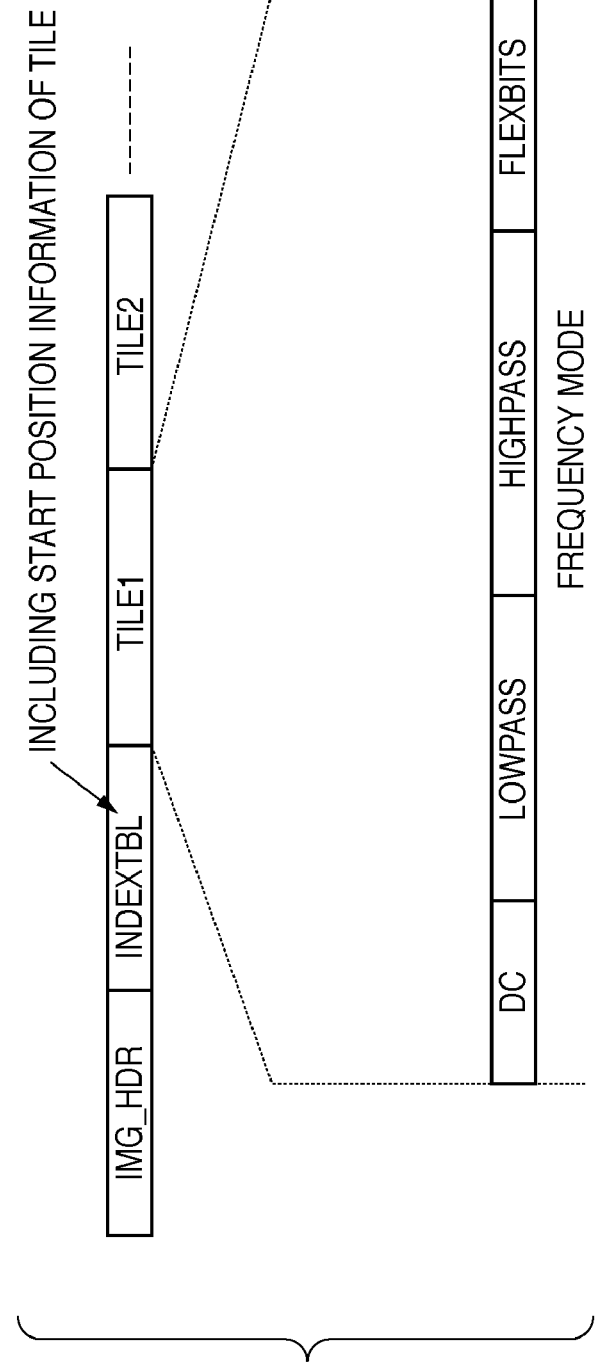

T_s (a, b)

T_Ro (a, b)

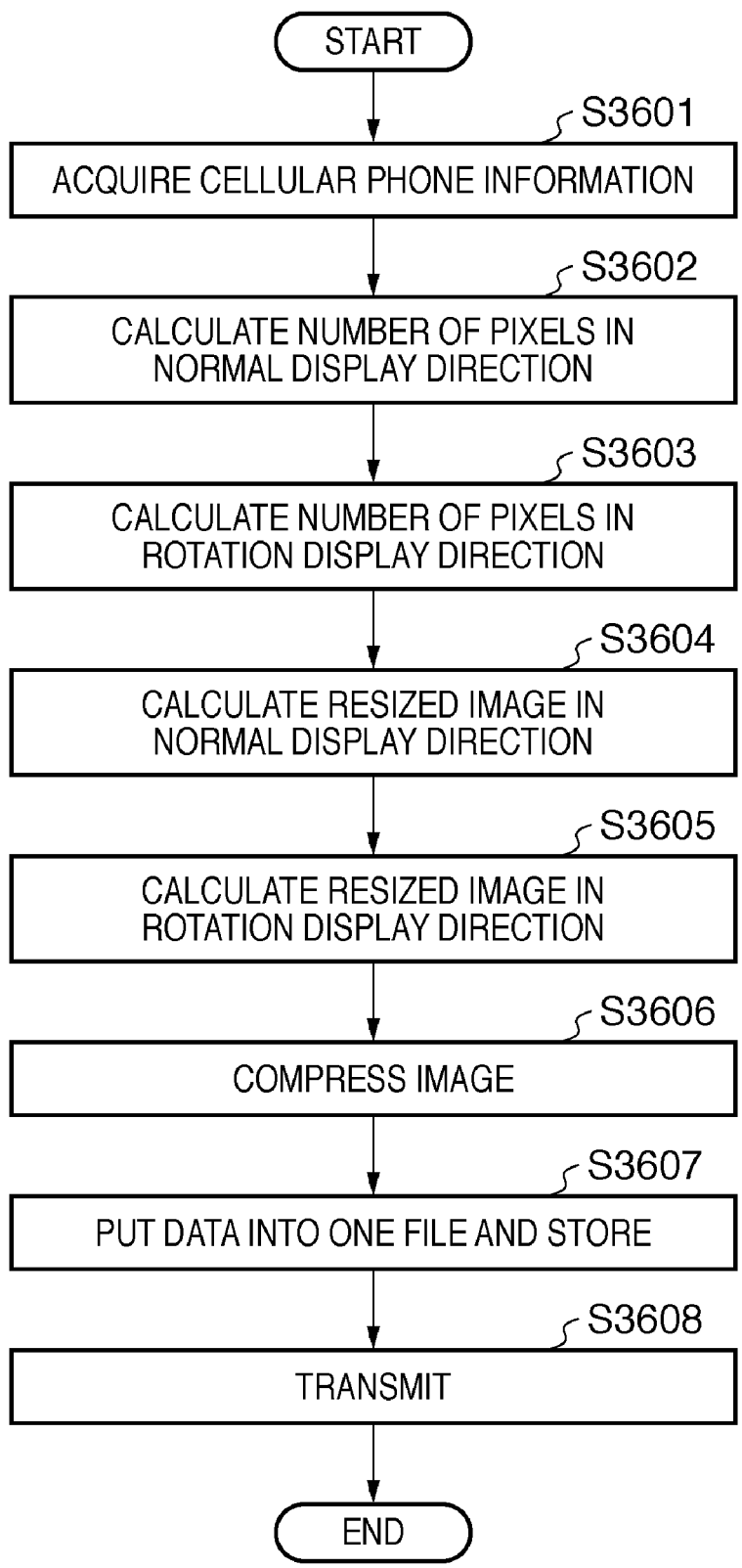

IMAGE ENCODING APPARATUS, IMAGE DECODING APPARATUS, AND METHODS OF CONTROLLING THE SAME

BACKGROUND OF THE INVENTION

1. Field of the Invention

The present invention relates to an image data encoding/decoding technique.

2. Description of the Related Art

Recent spread of personal computers and mobile terminals has led to broad use of digital data communication (data communication) via the Internet. Digital data used in data communication include images. An advantage of digital images is that, for example, copying, searching, and various kinds of image processing are relatively easy. Hence, a lot of people handle digital images.

For efficient use of digital images, image compression to reduce the file size is indispensable. Typical techniques are JPEG and PNG. Image compression may distort an image. Techniques of suppressing image quality degradation have been researched and developed. Techniques of attaining not only the primary function of reducing the file size but also attaining various other functions have also been developed. For example, JPEG 2000 enables encoded data generation by scalably decoding image data gradually from a low resolution up to its original resolution.

Techniques having an image quality improving function in addition to the above-described resolution scaling function have also been developed. For example, Japanese Patent Laid-Open No. 2006-197573 (to be simply referred to as a reference hereinafter) discloses this technique. This reference or a technique based on this reference is called HD Photo® in general. More specifically, an image is segmented into tiles. Discrete Cosine Transform (DCT) is repeatedly performed for the respective tiles, thereby generating the stream data of layers. To suppress block distortion generated among the tiles, predetermined processing is executed using the pixels of two adjacent tiles before or during the DCT.

Some of the encoding methods with the resolution scaling function are difficult to use because of few scaling steps or a large resolution difference between scalable layers. For example, HD Photo enables direct decoding to three kinds of resolutions. To obtain image data at a desired resolution, image data obtained upon decoding processing must undergo a lot of processing.

SUMMARY OF THE INVENTION

The present invention has been made in consideration of the above-described problem, and provides an encoded image data generation technique which suppresses block noise even at an intermediate resolution equal to or lower than the original resolution and further increases the number of directly decodable resolutions for higher convenience.

The present invention in its first aspect provides an image encoding apparatus for encoding image data, comprising: an input unit operable to input original image data as an encoding target; a reduction unit operable to reduce the input original image data to a resolution lower than a resolution of the original image data; a hierarchical encoder operable to encode the original image data input by the input unit and reduced image data obtained by the reduction unit and to generate encoded data having a hierarchical structure of the resolutions; and an output unit operable to output a set of the encoded original image data and reduced image data encoded by the hierarchical encoder.

The present invention in its second aspect provides an image decoding apparatus for decoding encoded image data of a file generated by the image encoding apparatus and outputting the image data to an output area of an output device, the image decoding apparatus comprising: a discriminator operable to analyze the file and to discriminate types of resolutions directly decodable from encoded data of original image data and encoded data of reduced image data; a determiner operable to determine, based on a discrimination result of the discriminator, which one of the encoded data of the original image data and the encoded data of the reduced image data enables direct decoding of image data having a minimum resolution not less than a resolution of the output area, and a code stream as a decoding process target; a decoder operable to decode the code stream specified by a result of determination of the determiner; and a resizing unit operable to resize, in accordance with the resolution of the output area, image data obtained upon decoding by the decoder.

The present invention in its third aspect provides a method of controlling the image encoding apparatus for encoding image data, the method comprising the steps of: inputting original image data as an encoding target; reducing the input original image data to a resolution lower than a resolution of the original image data; encoding the original image data input in the inputting step and reduced image data obtained in the reducing step and generating encoded data having a hierarchical structure of the resolutions; and outputting a set of the two encoded data encoded in the step of encoding the original image data and reduced image data.

The present invention in its fourth aspect provides a method of controlling the image decoding apparatus for decoding encoded image data of a file generated by the image encoding apparatus and outputting the image data to an output area of an output device, the method comprising the steps of: analyzing the file and discriminating types of resolutions directly decodable from encoded data of original image data and encoded data of reduced image data; determining, based on a discrimination result in the step of analyzing the file and discriminating the types of the resolutions, which one of the encoded data of the original image data and the encoded data of the reduced image data enables direct decoding of image data having a minimum resolution not less than a resolution of the output area, and a code stream as a decoding process target; decoding the code stream specified by a result of determination in the determining step; and resizing, in accordance with a resolution of the output area, image data obtained upon decoding in the decoding step.

According to the present invention, it is possible to suppress block noise even at an intermediate resolution equal to or lower than the original resolution and further increase the number of directly decodable resolutions for higher convenience.

Further features of the present invention will become apparent from the following description of exemplary embodiments with reference to the attached drawings.

BRIEF DESCRIPTION OF THE DRAWINGS

FIG. 6 is a flowchart illustrating the processing procedure of frequency conversion processing;

FIGS. 15A and 15B are views showing the data structure of encoded data according to the embodiment;

FIG. 33 is a flowchart of a server according to the sixth embodiment.

DESCRIPTION OF THE EMBODIMENTS

The embodiments of the present invention will now be described in detail with reference to the accompanying drawings.

In the embodiments of the present invention to be described below, the arrangement of the present invention is implemented in a digital camera. For the descriptive convenience, the digital camera of each embodiment can capture an image at an ultrahigh resolution (a resolution of more than 10,000,000 pixels). The display of a general-purpose information processing apparatus such as a personal computer normally has only about 1600×1200 pixels (≈2,000,000 pixels) and cannot display a photographed image at its full resolution. To display the whole image on such a display, it is necessary to generate a reduced image having an intermediate resolution lower than the original resolution. In the embodiments, when capturing an ultrahigh-resolution image, an image that has an intermediate resolution but minimum degradation in quality is generated.

[First Embodiment]

In this embodiment, when capturing an image using a digital camera, the user selects whether to increase the number of layers by increasing the number of code streams. A processing system is assumed to load a thus captured image into a personal computer and insert the low-resolution image of the captured image on document creation software.

Figure 19:
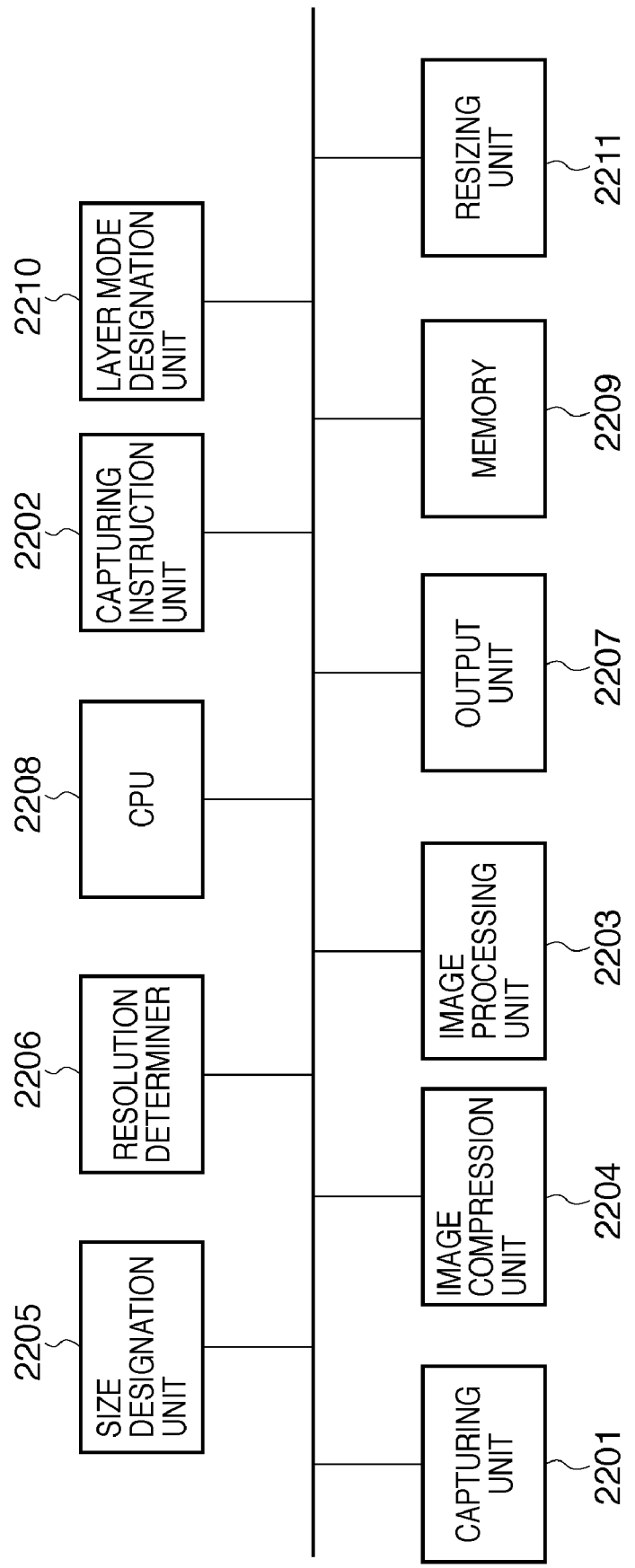
FIG. 19 is a block diagram showing the arrangement of a digital camera according to the first embodiment.

FIG. 19 is a block diagram showing the arrangement of a digital camera (image processing apparatus) according to the embodiment. The digital camera includes a capturing unit 2201, capturing instruction unit 2202, image processing unit 2203, image compression unit 2204, size designation unit 2205, resolution determiner 2206, output unit 2207, layer mode designation unit 2210, and resizing unit 2211. The digital camera also includes a CPU 2208 functioning as the controller of the entire apparatus, and a memory 2209 that stores programs to be executed by the CPU 2208 and serves as a work area. The memory 2209 also stores various kinds of set information. Note that the size designation unit 2205 and the layer mode designation unit 2210 are designated using buttons provided on an operation panel (not shown) or by selecting a menu. The capturing instruction unit 2202 is called a shutter button in a more familiar term.

On the digital camera of the embodiment, the user can set, via the size designation unit 2205, the resolution (size) of an image to be captured before capturing. For example, three sizes L, M, and S are selectable. The size L is 4000 horizontal pixels×3000 vertical pixels (to be referred to as 4000×3000 pixels hereinafter). The size M is 2000×1500 pixels. The size S is 1600×1200 pixels. That is, the capturing unit 2201 of the digital camera of the embodiment includes an image sensing device having a resolution of 4000×3000 pixels. The selected size is stored in a preset area of the memory 2209.

In addition, the user selects one of two layer modes i.e., a high layer mode or a low layer mode by operating the layer mode designation unit 2210. The selected layer mode is stored in a preset area of the memory 2209 as layer mode information. The high layer mode generates an image (resized image) at a resolution ½ that of the captured image (original image), compresses the original image and the resized image, and puts them together into one file. In resize processing, the color components of 2×2 pixels in original image data are averaged, and the average values of the color components are decided as the component values of one pixel after resizing.

When the user sets the resolution via the size designation unit 2205, as described above, and operates the shutter button included in the capturing instruction unit 2202, an image is captured at the designated resolution. The image undergoes image processing (e.g., white balance processing) and encoding processing to be described later. The generated encoded data is stored in a nonvolatile memory card connected to the output unit 2207.

Figure 20:
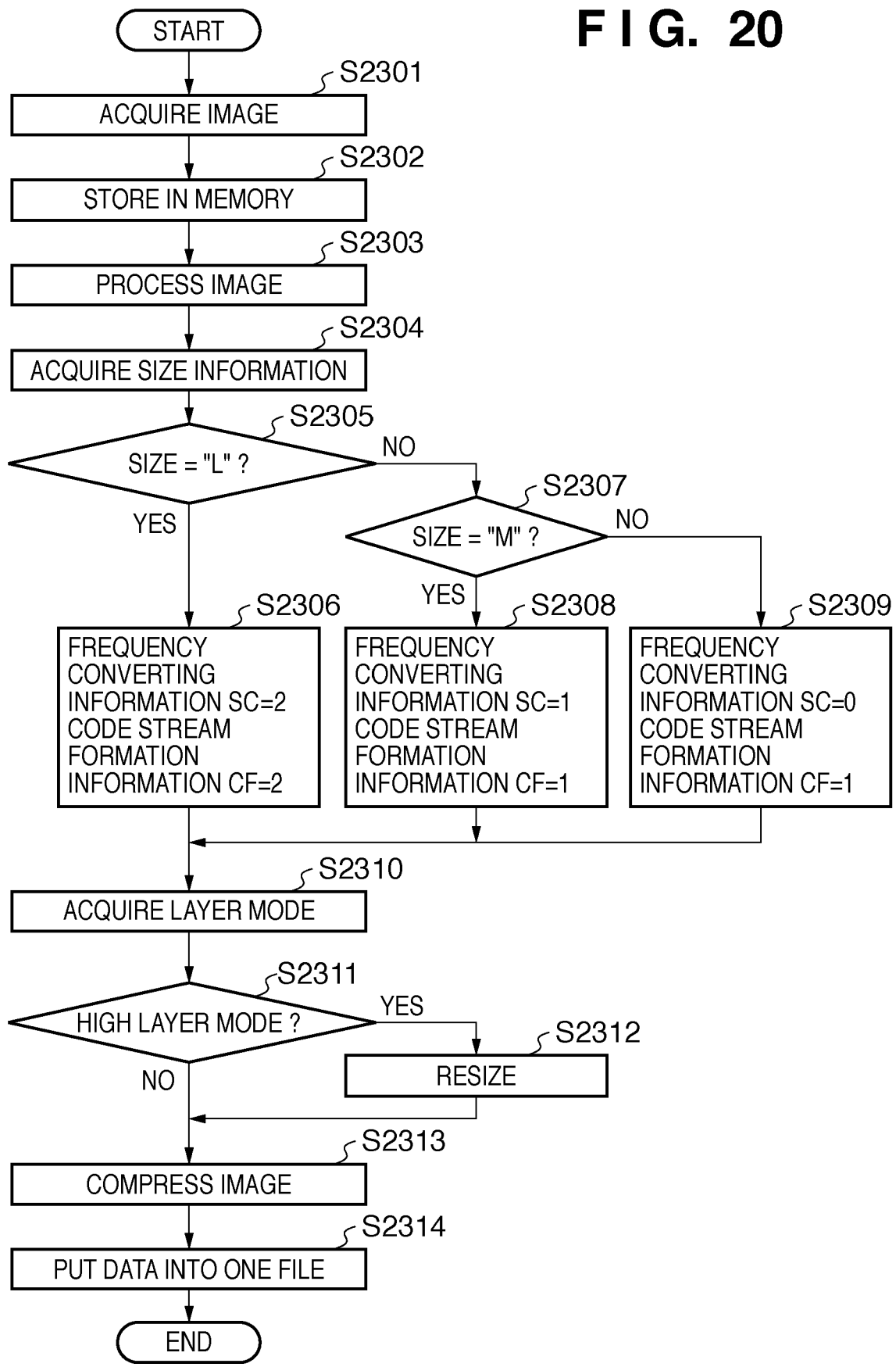
FIG. 20 is a flowchart illustrating the processing procedure of image capturing according to the first embodiment.

FIG. 20 is a flowchart illustrating the processing procedure of the CPU 2208 when the shutter button is operated. Processes such as AF and AE are not directly relevant to the present invention, and a description thereof will be omitted. The processing procedure will be described below in accordance with the flowchart in FIG. 20.

First, the CPU 2208 converts a photoelectrically converted signal obtained by the capturing unit 2201 into digital data, acquires the converted data as image data (step S2301), and temporarily stores it in the memory 2209 (step S2302).

The CPU 2208 controls the image processing unit 2203 and causes it to execute image processing of the image data stored in the memory 2209 (step S2303). The image processing includes processing of converting RGB data in a Bayer matrix into a normal arrangement, white balance processing, sharpness processing, and color processing. The image data as the image processing result is stored in the memory 2209 again. After the image processing, the process advances to step S2304 to acquire set size information from the memory 2209. The size designated by the user is then determined (step S2305).

If the size L is designated (YES in step S2305), "2" is set in each of two pieces of information about image compression, i.e., frequency converting information SC and code stream formation information CF. These pieces of information are set in the image compression unit 2204 (step S2306). That is, the frequency converting information SC and code stream formation information CF can be regarded as parameters for image compression by the image compression unit 2204.

The frequency converting information SC and the code stream formation information CF will be described later in detail. In this embodiment, the frequency converting information SC takes one of three values "0", "1", and "2". "2" instructs processing of improving image quality at an intermediate resolution. The frequency converting information SC is also used as information representing the execution count of frequency conversion processing to be described later. On the other hand, the code stream formation information CF takes one of two values "1" and "2". "2" instructs code stream formation of intermediate resolution priority. When both the frequency converting information SC and the code stream formation information CF are "2", the sequence involves complex processing, and the processing requires a longer time. However, an L-size image has an enormous number of pixels and is therefore rarely displayed at the maximum resolution in actual display step. It will probably be displayed at an intermediate resolution lower by some grades than the maximum resolution. In this embodiment, if the size L is set, both the frequency converting information SC and the code stream formation information CF are set to "2", as described above, to perform processing corresponding to processing after display processing.

If the designated size is not L (if the size M or S is designated), the process advances to step S2307 to determine whether the designated size is M. If the size M is designated, the process advances to step S2308 to set the frequency converting information SC "1" and the code stream formation information CF "1" in the image compression unit 2204.

Upon determining that the designated size is not M, i.e., the size S is designated, the process advances to step S2309 to set the frequency converting information SC "0" and the code stream formation information CF "1" in the image compression unit 2204.

Subsequently, the CPU 2208 acquires layer mode information from the memory 2209 (step S2310). If the layer mode is the high layer mode (YES in step S2311), the CPU 2208 controls the resizing unit 2211 to generate an image whose resolution in the horizontal and vertical directions is ½ that of the captured image data (step S2312). The original image data and the resized image (reduced image data) are output to the image compression unit 2204. That is, the image compression unit 2204 encodes the two images, i.e., the original image and the resized image. If the layer mode is the low layer mode (NO in step S2311), only the original image data is output to the image compression unit 2204. In short, when the high layer mode is designated, the original image and its resized image are compressed. When the high layer mode is not designated, only the original image is compression-coded.

After that, the process advances to step S2313 to cause the image compression unit 2204 to start compression processing. Then, in step S2314, the CPU 2208 forms the file of the generated encoded data and stores it in a memory card. In the high layer mode, the CPU 2208 puts the two encoded image data after the image compression processing together into one file and stores it in a memory card. At this time, the file header stores information representing one of the two layer modes. In the high layer mode, the file header also stores the start position information of the encoded data of each of the original image and the resized image.

Details of the image compression unit 2204 according to the embodiment will be described next.

The image compression unit 2204 of the embodiment employs the HD Photo® technique of the above-described patent reference and generates layered encoded data having a hierarchical structure. A characteristic part of the embodiment will be explained below based on this technique.

Figure 1:
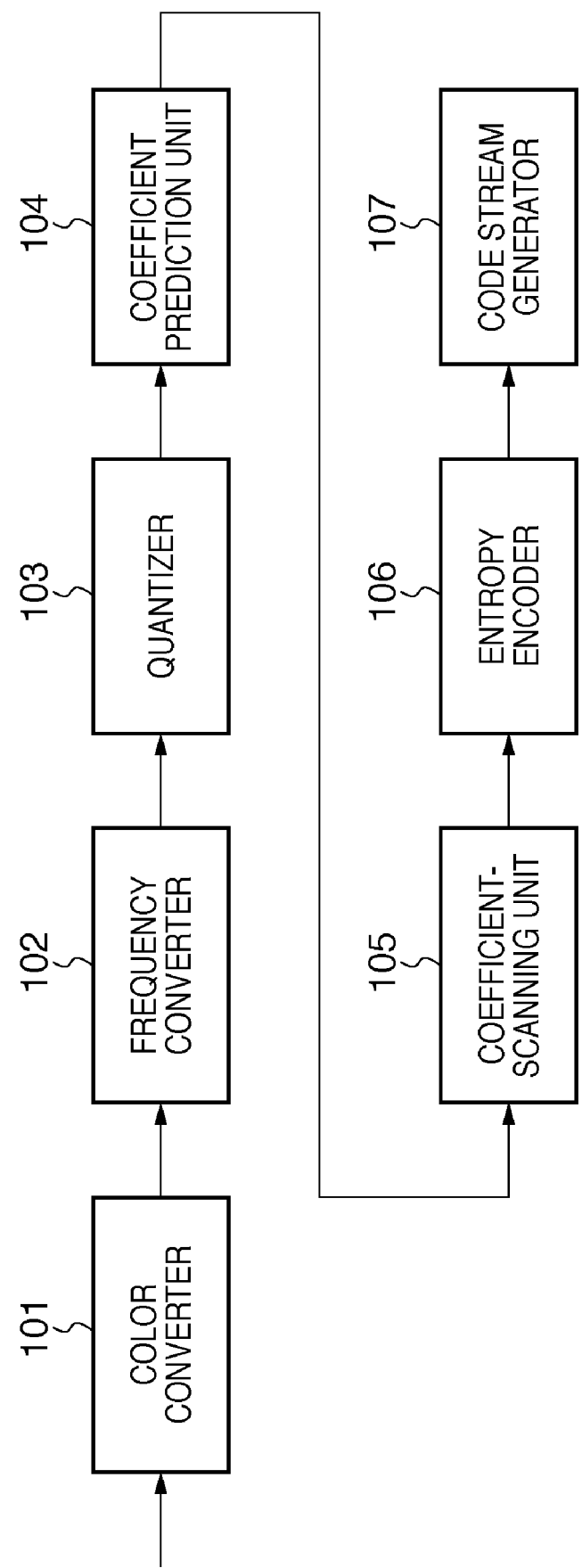
FIG. 1 is a block diagram showing the arrangement of an image compression unit according to an embodiment.

FIG. 1 is a block diagram showing the arrangement of the image compression unit 2204 according to the embodiment.

The image compression unit 2204 includes a color converter 101, frequency converter 102, quantizer 103, coefficient prediction unit 104, coefficient-scanning unit 105, entropy encoder 106, and code stream generator 107.

Terms will be defined prior to the explanation of processing of the image compression unit 2204. "Block" is the minimum unit of encoding processing and has a size of 4×4 pixels in the embodiment. "Macro block" is a unit containing a plurality of blocks; macro blocks are 4×4 blocks (i.e., 16×16 pixels) in the embodiment. "Tile" is a unit containing a plurality of macro blocks, and are M×N macro blocks (where M and N are integers of 1 or more, and one of them is 2 or more). In the embodiment, M=6, and N=4. That is, one tile has a size corresponding to 6×4 macro blocks=96×64 pixels. The definitions of a block, macro block, and tile here are merely examples, and their sizes do not limit the present invention. The image compression unit 2204 compression-codes each tile. The minimum unit of the processing is a block (4×4 pixels).

The color converter 101 converts RGB data (in the embodiment, each component has 8 bits=256 tones) into a YUV color space, and outputs the conversion result to the frequency converter 102. The RGB→YUV conversion is done in accordance with, e.g., the following conversion formula.

$$\begin{bmatrix} Y \\ U \\ V \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$$

The Y, U, and V components are individually encoded. For the sake of simplicity, Y (luminance) will be explained below. Note that image data in the following description indicates image data expressed by the Y component (understanding of the U and V components can be obtained by properly substituting them for the Y component).

Figure 2:
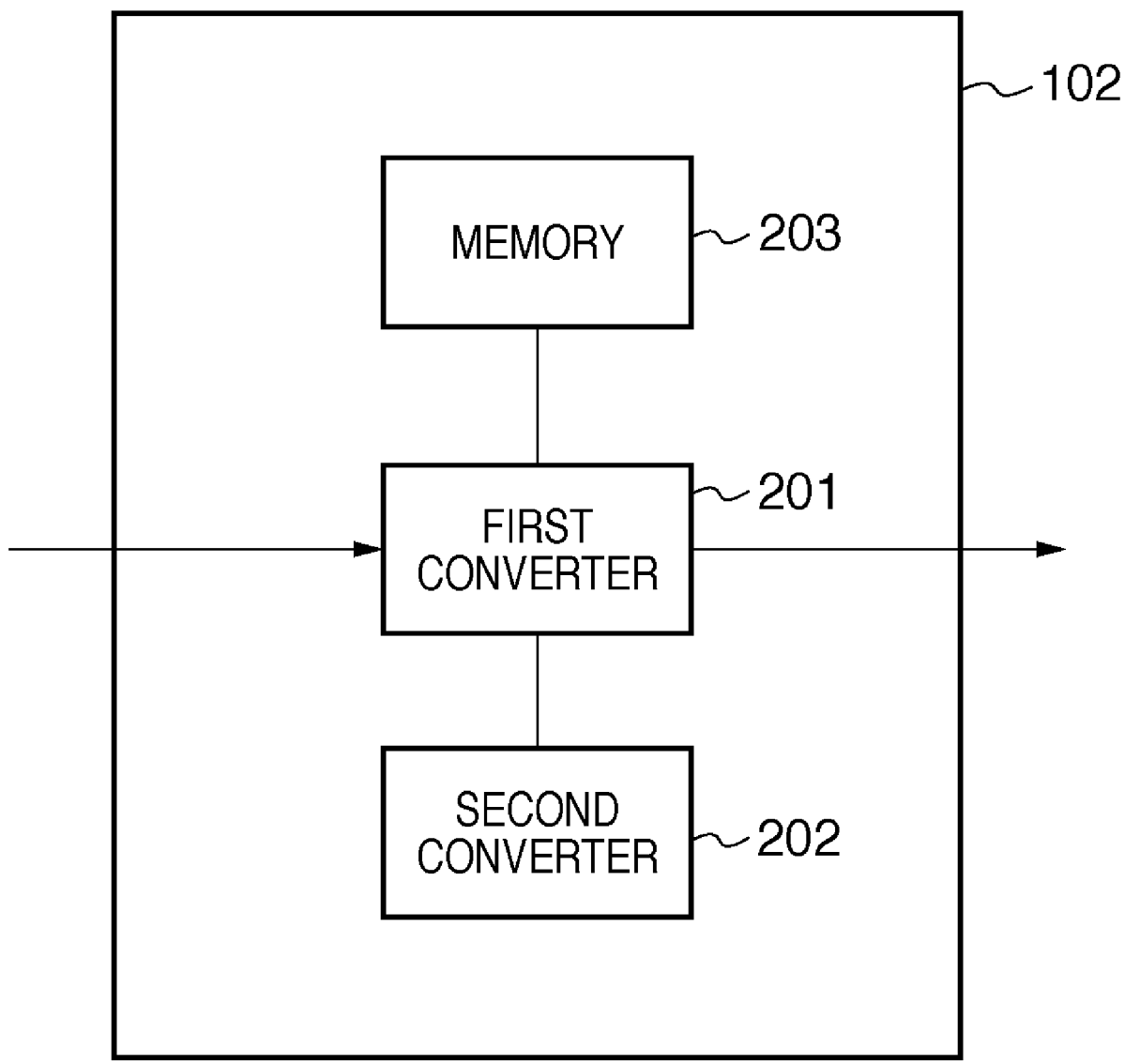
FIG. 2 is a block diagram showing the arrangement of a frequency converter according to the embodiment.

The frequency converter 102 includes a first converter 201, second converter 202, and memory 203, as shown in FIG. 2. The first converter 201 performs essential processing and also controls the frequency converter 102. The second converter 202 performs optional processing which need not always be executed. The first converter 201 is in charge of handling to determine whether to cause the second converter 202 to execute processing. If the second converter 202 executes processing, the load on encoding processing and the time required for the processing increase. However, a decoded image (especially, an image having a resolution lower than the original resolution) has a more desirable image quality. The memory 203 holds the above-described frequency converting information SC.

Figure 3:
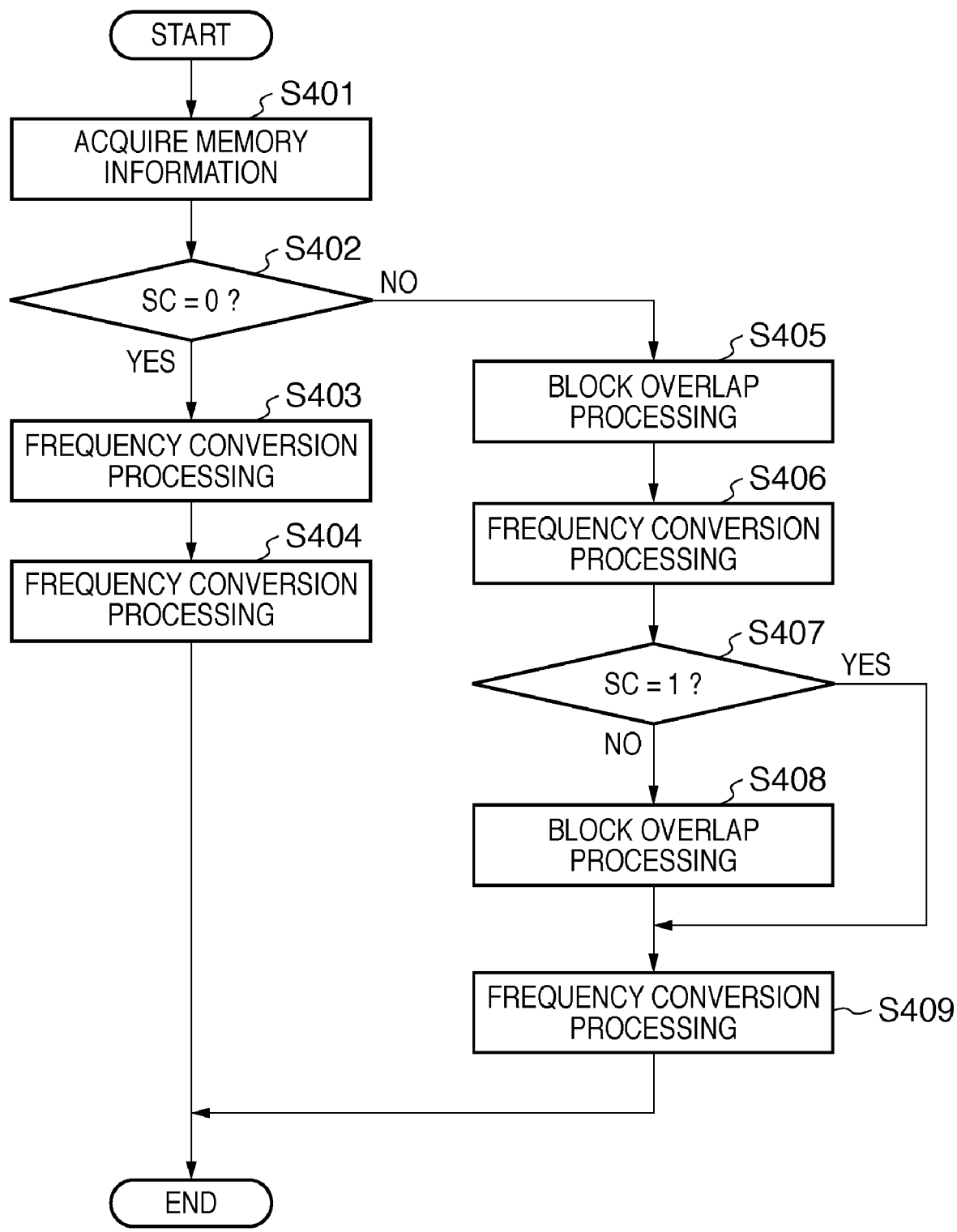
FIG. 3 is a flowchart illustrating the processing procedure of the frequency converter according to the embodiment.
Figure 4:
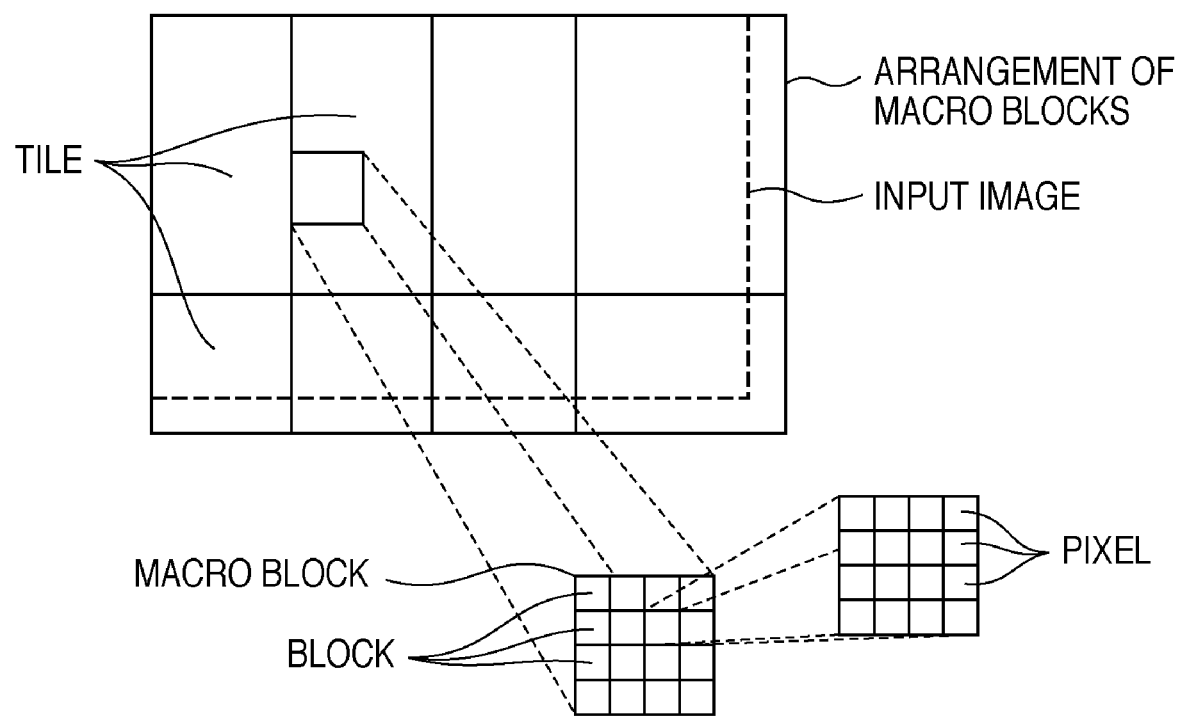
FIG. 4 is a view showing the relationship between tiles, macro blocks, and blocks in an image according to the embodiment.

The frequency converter 102 receives Y component data, and segments the image into tiles, as shown in FIG. 4 (one tile includes 6×4 macro blocks in the embodiment). The memory 203 stores the frequency converting information SC ("0", "1", or "2"). The first converter 201 and the second converter 202 execute processing in accordance with the flowchart in FIG. 3 in accordance with the information.

In step S401, the first converter 201 acquires the frequency converting information SC from the memory 203. In step S402, the first converter 201 determines whether the frequency converting information SC is "0".

If the frequency converting information SC is "0", the first converter 201 does not request conversion processing by the second converter 202. The first converter 201 executes frequency conversion processing twice in steps S403 and S404. This processing will be described in detail with reference to FIG. 5.

First, each of the 4×4 blocks included in one macro block undergoes frequency conversion processing (first stage). One DC component (direct current component) data and 15 (=4× 4−1) AC component (alternating current component) data are obtained from one block. As described above, one macro block includes 4×4 blocks. Hence, 4×4 DC component data and 15×4×4 AC component data are obtained from one macro block. A set of 4×4 DC component values will be called a DC block.

This is the process in step S403, i.e., the first frequency conversion processing.

The process in step S404 (second frequency conversion processing) will be described next.

The target of the second frequency conversion in step S404 is the above-described DC block (second stage). As a result, one DC component value and 15 AC component values are obtained from the DC block. The latter AC component values are calculated from the DC components of the DC block (4×4 pixels) and are therefore represented as ACDC components in FIG. 5.

To discriminate between the components generated in steps S403 and S404, the DC component data and the AC component data obtained in the first process (step S403) are called DC component data of first level and AC component data of first level, respectively. The DC component data and the ACDC component data obtained in the second process (step S404) are called DC component data of second level and AC component data of second level, respectively.

The frequency conversion processing is performed in accordance with the procedure of the flowchart in FIG. 6. Note that the flowchart illustrates processing of one block (4×4 pixels). That is, since a macro block includes 4×4 blocks, processing conforming to the flowchart in FIG. 6 is performed 16 times in the first frequency conversion processing (step S403).

Figures 7A, 7B:
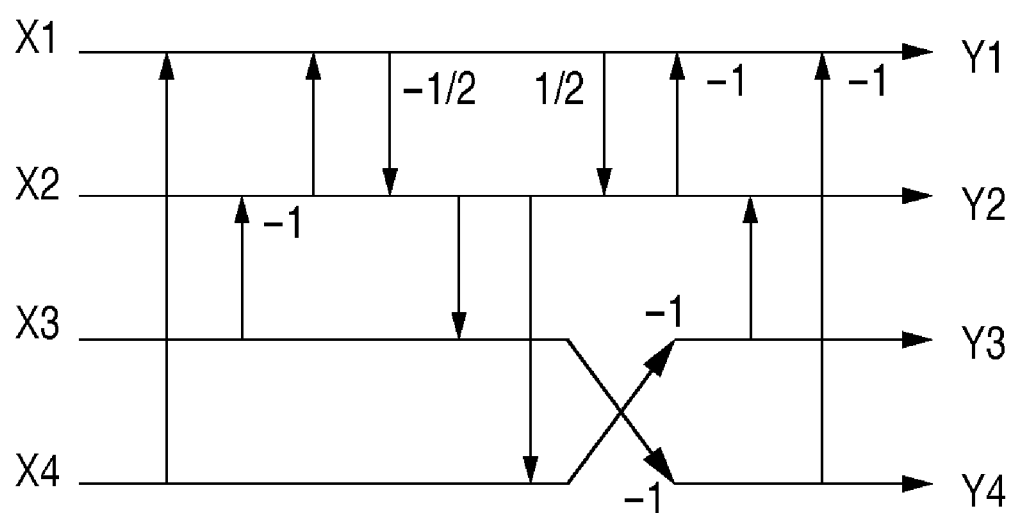
FIGS. 7A to 7D are views showing pixel positions in a block in frequency conversion processing and the structures of three filters.
Figure 7C:
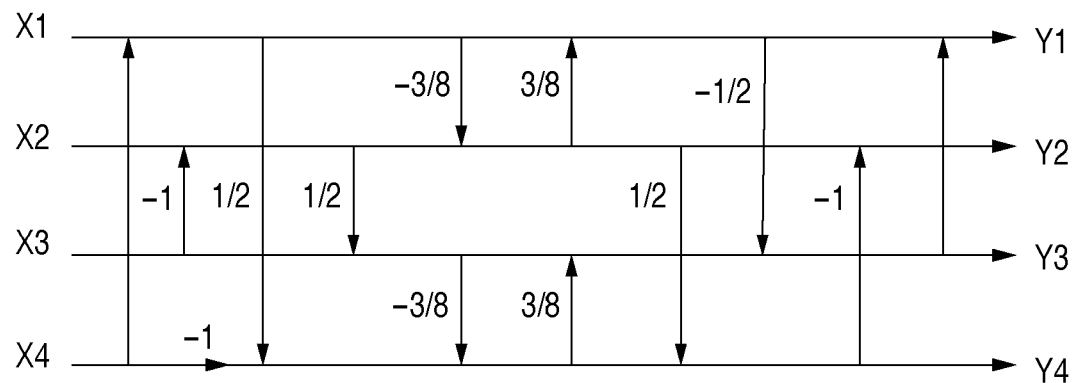

Conversion processing (filtering processing) in each of steps S71 to S78 of the flowchart in FIG. 6 is performed by one of conversion circuits (filtering circuits) having the same name as the processing in FIGS. 7B and 7C. Arguments a to p of each conversion processing in FIG. 6 correspond to pixel positions a to p in a block of interest shown in FIG. 7A.

Figure 7D:
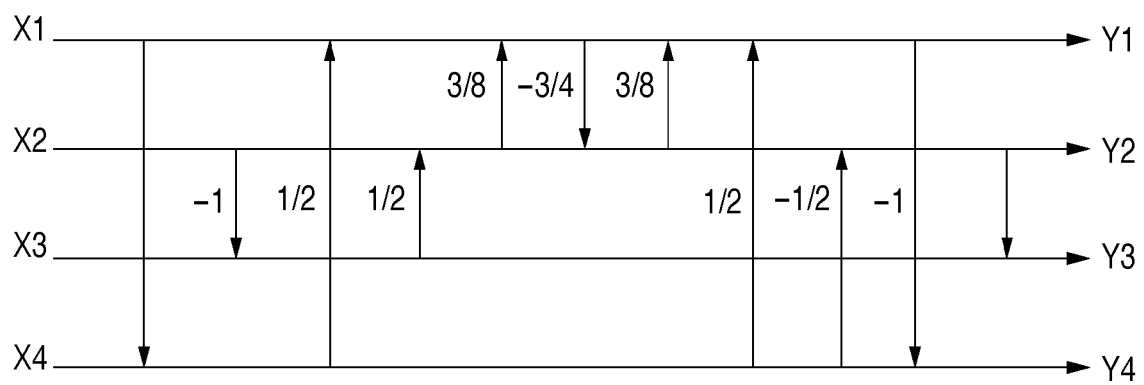

First conversion processing T_H(a, d, m, p) in step S71 of FIG. 6 is executed by the circuit shown in FIG. 7B. More specifically, a, d, m, and p in FIG. 7A are set in input terminals X1, X2, X3, and X4 in FIG. 7B, respectively, and calculation starts. The initial values of a, d, m, and p are updated to four values that appear at output terminals Y1, Y2, Y3, and Y4. This also applies to processing from step S72. In step S78, after the signs of the data 1 and o are reversed, T_Odd_Odd calculation processing (FIG. 7D) is executed.

Plainly speaking of DC components of the processing in FIG. 6, in the first four processes (steps S71 to S74), temporary low frequency components obtained from the data of the block of interest (4×4 pixels) are concentrated to the 2×2 positions (a, b, e, and f in FIG. 7A) of the upper left corner. In step S75, one DC component of the block of interest is stored at the position "a" in FIG. 7A using the data of the 2×2 temporary low frequency components stored at the positions {a, b, e, f} of the upper left corner.

The 15 AC components are generated by the processes in steps S71 to S78.

Figure 5:
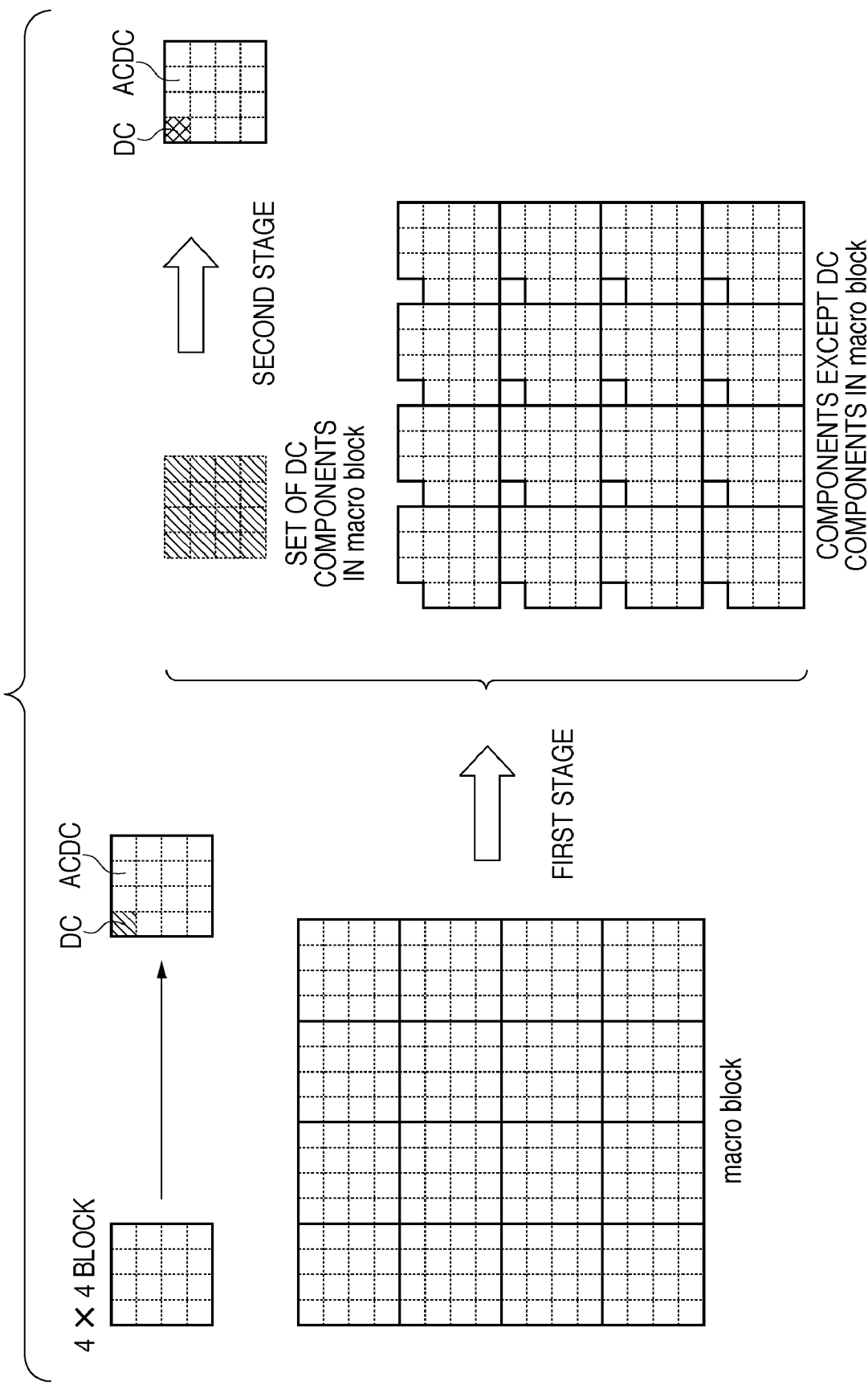
FIG. 5 is a view for explaining frequency conversion processing.

The first frequency conversion processing is performed for each of the 16 blocks included in the macro block of interest in FIG. 5. In the second frequency conversion processing, processing represented by the flowchart in FIG. 6 is performed once, regarding that the DC block (4×4 DC component values) obtained from the macro block of interest has the arrangement shown in FIG. 7A.

As described above, the two frequency conversion processes yield one DC component, 15 (=4×4−1) ACDC components, and 240 (=15×4×4) AC components from one macro block.

Encoding processing according to the embodiment generates encoded data of each tile. In the embodiment, one tile includes 6×4 macro blocks. Hence, the processes in steps S403 and S404 are repeated as many times as the number of macro blocks included in one tile.

Referring back to FIG. 3, if the first converter 201 determines in step S402 that the frequency converting information SC acquired from the memory 203 is not "0", i.e., SC=1 or 2, the process advances to step S405. In step S405, the first converter 201 instructs the second converter 202 to start conversion processing.

The second converter 202 performs correction processing in a range across (overlapping) a block boundary to correct its distortion that occurs because the processing of the first converter 201 is based on calculation in each block. The processing of the second converter 202 will therefore be referred to as block overlap processing hereinafter.

Figure 8:
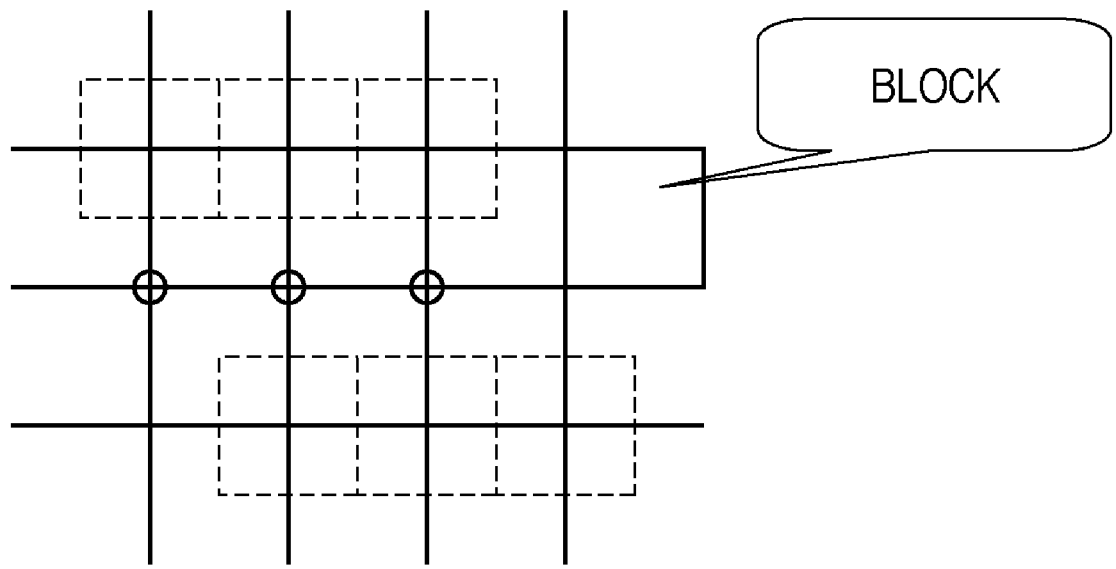
FIG. 8 is a view showing a target of block overlap processing.

Upon receiving an activation instruction from the first converter 201, the second converter 202 performs block overlap processing using a window across (overlapping) the boundary between blocks (4×4 pixels) in an input tile, as shown in FIG. 8 (step S405).

Figure 16:
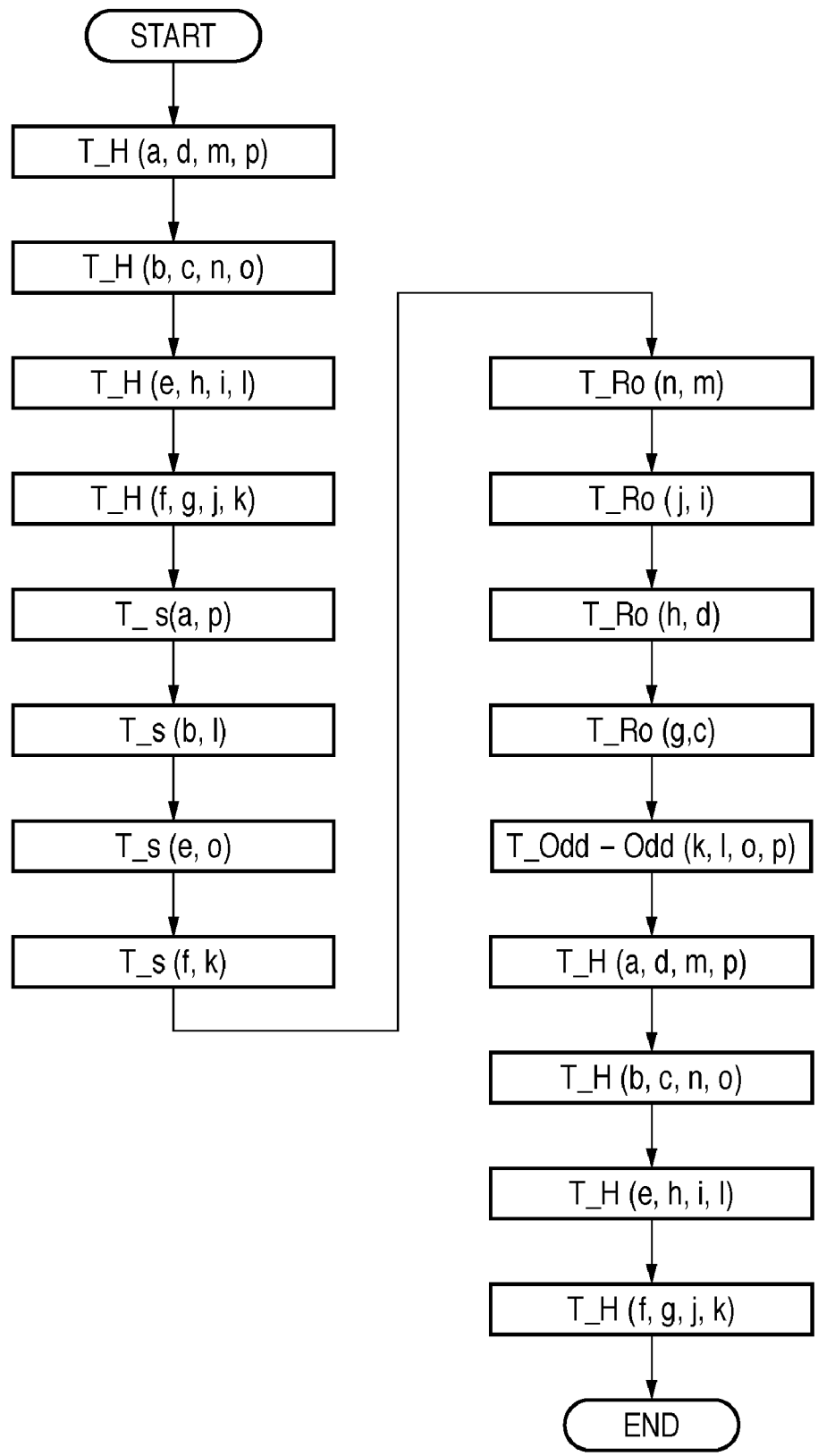
FIG. 16 is a flowchart illustrating the processing procedure of block overlap processing.
Figure 17A:
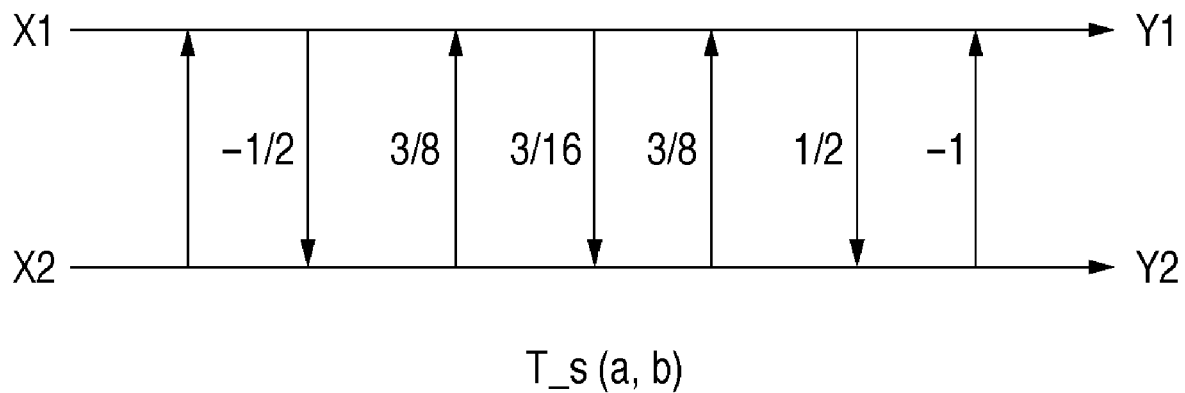
FIGS. 17A and 17B are views showing circuit arrangements corresponding to two conversion formulas in block overlap processing.
Figure 17B:
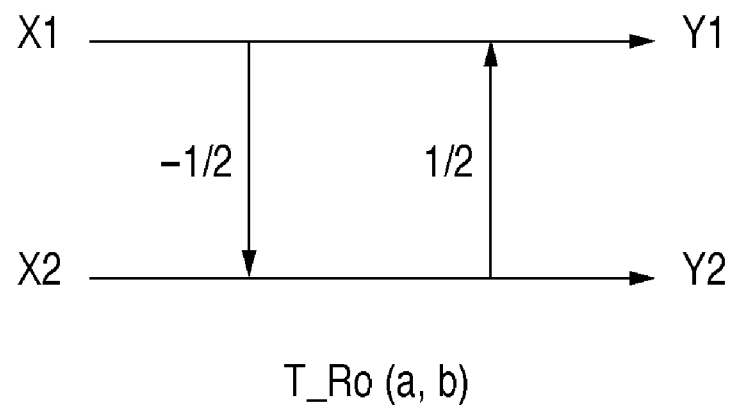

The block overlap processing is illustrated by the flowchart in FIG. 16. In FIG. 16, two filtering processes, i.e., T_s( ) and T_Ro( ) are added to the above-described processing shown in the flowchart of FIG. 6. The circuit arrangements shown in FIGS. 17A and 17B implement T_s( ) and T_Ro( ). T_s( ) and T_Ro( ) are 2-input 2-output filtering processes.

The block overlap processing processes a range across the process target blocks of the above-described frequency conversion processing, thereby suppressing discontinuity at the block boundary of frequency conversion.

Then, the process advances to step S406. The first converter 201 performs frequency conversion processing once. The frequency conversion processing in step S406 is executed for each of 4×4 blocks in a region corresponding to the macro block in FIG. 5. That is, 16 blocks are frequency-converted to calculate 16 DC components and 240 AC components, as in step S403. In the embodiment, one tile includes 6×4 macro blocks. Hence, the processing is executed 24 times.

Next, in step S407, the first converter 201 determines whether the frequency converting information SC acquired from the memory 203 is "1". If the first converter 201 determines that the frequency converting information SC is "1", the process advances to step S409. If the first converter 201 determines that the frequency converting information SC is not "1", i.e., the frequency converting information SC is "2", the process advances to step S408 to cause the second converter 202 to execute second block overlap processing (FIG. 16).

Note that 6×4 DC blocks are targeted for the block overlap processing executed by the second converter 202 in step S408.

In step S409, second frequency conversion processing is executed. The second frequency conversion processing is the same as in step S404 except that it targets the set of a plurality of DC blocks included in one tile that has undergone the process in step S406 or S408. More specifically, one tile includes 6×4 macro blocks, and one DC block is generated from one macro block. Hence, the frequency conversion is executed for 24 DC blocks.

The above-described processing will be summarized. The processing of a macro block according to the embodiment is as follows.

When the size of an image to be captured is S:
Frequency conversion processing→frequency conversion processing When the size of an image to be captured is M:
Block overlap processing→frequency conversion processing→frequency conversion processing When the size of an image to be captured is L:
Block overlap processing→frequency conversion processing→block overlap processing→frequency conversion processing The processing of the frequency converter 102 in FIG. 1 has been described above.

The frequency converter 102 outputs the conversion result to the quantizer 103 of the succeeding stage. The quantizer 103 acquires a value QPindex from outside via an input section (not shown), and calculates a quantization step (to be referred to as a QP hereinafter) based on the QPindex and the following conversion formula.

When QPindex≦16

$$QP=QPindex$$

When QPindex>16

$$QP=((QPindex\%16)+16)<<((QPindex>>4)-1)$$

Note that "x<<y" represents that a value x is to be shifted to the right side by y bits, and "x>>y" represents that a value x is to be shifted to the left side by y bits.

Note that according to HD Photo®, there are the following three degrees of freedom in setting a QP to be described here, and a QP can be set by combining them. The embodiment also complies with it.

Axis of degree of freedom 1: spatial degree of freedom:
1.1 Set a single QP for all macro blocks in an image
1.2 Set a single QP for all macro blocks in a tile
1.3 Freely set a QP for each macro block in a tile Axis of degree of freedom 2: frequency degree of freedom:
2.1 Set a single QP for all frequency components
2.2 Set a single QP for DC components and low-pass components (ACDC components), and different QPs for high-pass components (AC components)
2.3 Set a single QP for low-pass and high-pass components, and different QPs for DC components
2.4 Set different QPs for the frequency components Axis of degree of freedom 3: color plane degree of freedom:
3.1 Set a single QP for all color planes
3.2 Set a QP for a luminance plane, and a single QP for planes other than the luminance plane
3.3 Independently set a QP for each plane For example, quantization in conventional JFIF is done based on spatial degree of freedom 1.1 and color plane degree of freedom 3.2. Note that JFIF assigns a quantization step to each coefficient in a macro block and therefore has no item corresponding to the frequency degree of freedom.

The quantizer 103 thus ends the quantization processing and outputs the quantized data to the coefficient prediction unit 104. The coefficient prediction unit 104 performs coefficient prediction and outputs a prediction error. Coefficient prediction is executed based on different rules for the DC components, low-pass components, and high-pass components. A prediction calculation method is decided for each tile. Any coefficient of an adjacent tile is not used. Prediction calculation of each component by the coefficient prediction unit 104 will be described below.

(1) DC Component Prediction

As described above, in the embodiment, one tile includes 6×4 macro blocks. One DC component is obtained from one macro block (FIG. 5). Hence, 6×4 DC components that have undergone the quantization processing are obtained from one tile.

DC component prediction processing (prediction error calculation processing) of the coefficient prediction unit 104 will be described.

Figure 9:
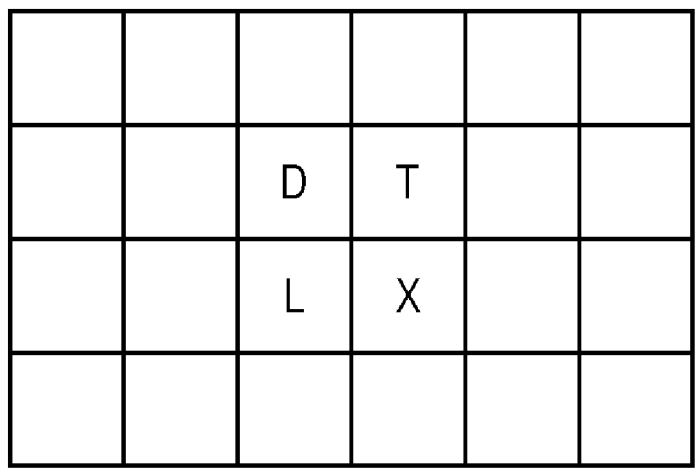
FIG. 9 is a view showing the relationship between a DC component X of interest and neighboring DC components to be referred to for its prediction processing according to the embodiment.

DC component values in one tile are raster-scanned. FIG. 9 shows the relationship between a DC component X of a macro block of interest and neighboring DC components D, T, and L relatively adjacent to the DC component X during scanning processing of a tile. Note that in raster scanning, the neighboring DC components D, T, and L near the DC component X of interest are located at positions where prediction processing (prediction error calculation) has already ended.

When the DC component X of interest is at the upper left corner, all the neighboring DC components D, T, and L are located outside the tile. When the DC component X of interest is on the first line except the upper left corner, the neighboring DC components D and T are located outside the tile. When the DC component X of interest is on the left edge except the upper left corner, the neighboring DC components D and L are located outside the tile. The neighboring DC components outside the tile to be referred to are assumed to have a predetermined value (e.g., "0"). The predetermined value need not always be "0" if it is the same as in the image decoding apparatus.

Figure 10:
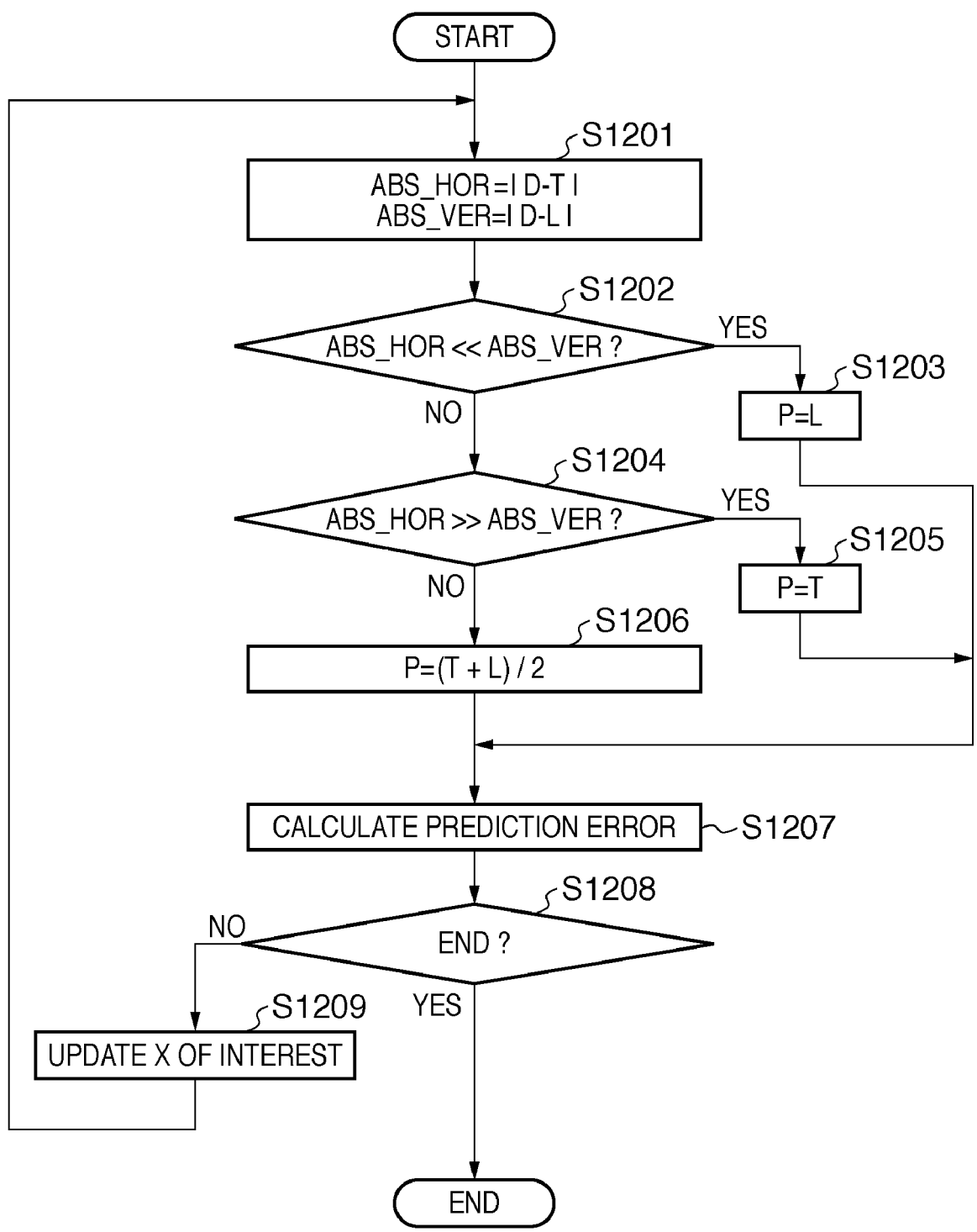
FIG. 10 is a flowchart illustrating the processing procedure of DC component prediction processing.

DC component prediction processing in a tile will be described below with reference to the flowchart in FIG. 10.

First, in step S1201, the coefficient prediction unit 104 calculates a difference absolute value (horizontal difference absolute value) ABS_HOR between the neighboring DC component values D and T, and a difference absolute value (vertical difference absolute value) ABS_VER between the neighboring DC component values D and L.

In step S1202, it is determined whether ABS_HOR<<ABS_VER, i.e., ABS_HOR is sufficiently smaller than ABS_VER. More specifically, it is determined that ABS_HOR is sufficiently smaller than ABS_VER when ABS_HOR−ABS_VER<Th where Th is a predetermined positive threshold.

Plainly speaking of the process in step S1202, it is determined whether similar images continue in the horizontal direction rather than in the vertical direction near the tile of interest (the position X in FIG. 9). If ABS_HOR<<ABS_VER in step S1202, the process advances to step S1203 to decide to use the left DC component L as a predicted value P of the DC component X of interest.

If NO in step S1202, the process advances to step S1204. In step S1204, it is determined whether ABS_HOR>>ABS_VER, i.e., ABS_VER is sufficiently smaller than ABS_HOR. As in step S1202, it is determined that ABS_VER is sufficiently smaller than ABS_HOR when ABS_VER−ABS_HOR<Th If ABS_VER<<ABS_HOR (YES in step S1204), the difference between the DC component X of interest and the DC component T located adjacent in the vertical direction is small at a high probability. The process advances to step S1205 to decide to use the upper DC component T as the predicted value P of the DC component X of interest.

If NO in step S1204, the process advances to step S1206 to decide to use (T+L)/2 as the predicted value P of the DC component X of interest. Note that (T+L)/2 is obtained by calculating T+L and then shifting the calculated value to the lower side by one bit (fractions below the decimal point are dropped).

In one of steps S1203, S1205, and S1206, the predicted value P of the DC component X of interest is obtained. In step S1207, the difference between the DC component X of interest and the predicted value P is calculated as a prediction error.

Then, the process advances to step S1208 to determine whether prediction error calculation has ended for all DC components in the tile of interest. If NO in step S1208, the position of the DC component X of interest is updated to the next position in step S1209, and the process returns to step S1201.

In the above-described way, prediction error calculation processing of the 6×4 DC components in the tile of interest is performed.

(2) Low-Pass Component Prediction

Figure 11:
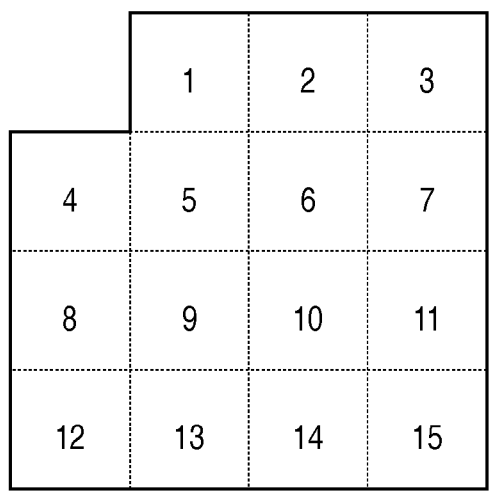
FIG. 11 is a view showing the data arrangement of process target blocks of low-pass component prediction.

FIG. 11 shows the arrangement of ACDC components after quantization of one macro block. This arrangement also indicates ACDC component values (FIG. 5) obtained by performing second frequency conversion processing for a macro block. Targets of low-pass component prediction processing are ACDC components {1, 2, 3} or ACDC components {4, 8, 12} in FIG. 11. For example, when it is decided to perform prediction processing of the ACDC components {4, 8, 12} in FIG. 11, the ACDC components {1, 2, 3, 5, 6, 7, 9, 10, 11, 13, 14, 15} at the remaining positions do not undergo prediction error calculation processing.

If the macro block of interest is located on the left edge or upper edge of the tile, there is no macro block which is adjacent to the macro block of interest and should be referred to. If no macro block to be referred to exists, it is assumed that {1, 2, 3} have undergone prediction error calculation in the inexistent macro block. The prediction error calculation targets may be {4, 8, 12}. That is, the targets need only be the same on the encoding side and on the decoding side.

Figure 12:
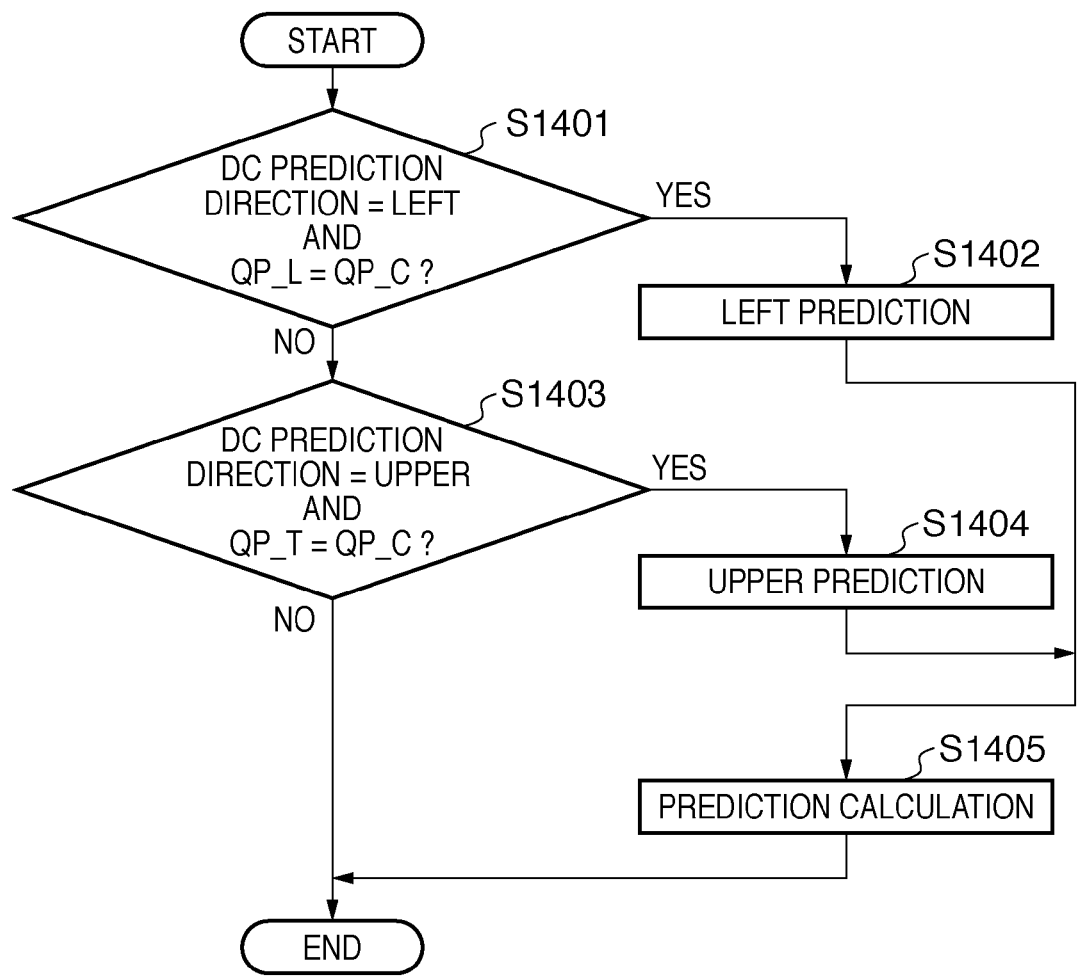
FIG. 12 is a flowchart illustrating the processing procedure of low-pass component prediction processing.

FIG. 12 is a flowchart illustrating the processing procedure of low-pass component prediction processing. The processing will be described below with reference to the flowchart.

In step S1401, it is determined whether the DC prediction direction of the macro block on the left side of the block of interest is horizontal, and a quantization parameter QP_C of the DC component of the macro block of interest equals a quantization parameter QP_L of the DC component of the macro block on the left side of the macro block of interest. If the two conditions are satisfied (YES in step S1401), the horizontal direction is decided as the prediction direction of the block of interest. More specifically, {1, 2, 3} in FIG. 11 are decided as prediction error calculation targets, and the remaining components are excluded from the targets. In step S1405, prediction error calculation is performed.

If NO in step S1401, the process advances to step S1403. In step S1403, it is determined whether the DC prediction direction of the macro block on the upper side of the block of interest is vertical, and the quantization parameter QP_C of the DC component of the macro block of interest equals a quantization parameter QP_T of the DC component of the macro block on the upper side of the macro block of interest. If the two conditions are satisfied, the vertical direction is decided as the prediction direction of the block of interest. More specifically, {4, 8, 12} in FIG. 11 are decided as prediction error calculation targets, and the remaining components are excluded from the targets. In step S1405, prediction error calculation is performed.

If NO in step S1403, the processing ends without performing prediction error calculation for the ACDC components in the macro block of interest.

(3) High-Pass Component Prediction

Figure 13C:
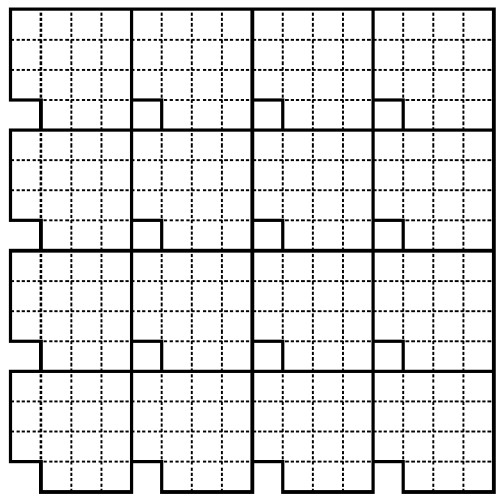
FIGS. 13A to 13D are views showing the relationship between the scanning direction and the data arrangement of process target blocks of low-pass component prediction.
Figure 13B:
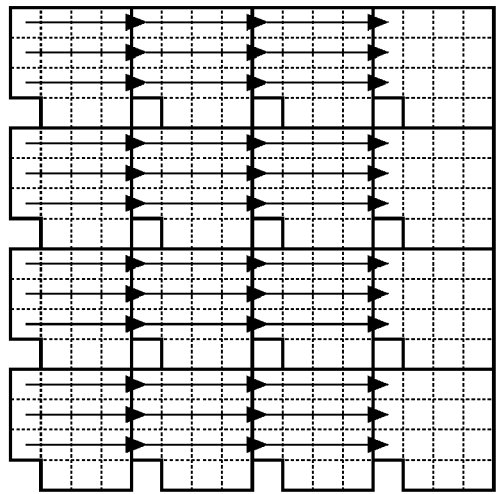
Figure 13A:
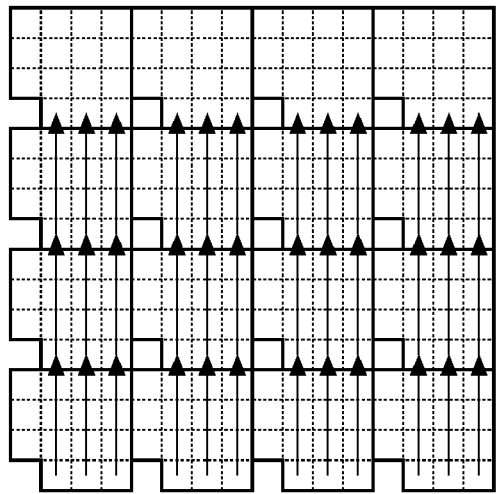
Figure 13D:

FIGS. 13A to 13C are views showing (three) prediction directions of high-pass components. High-pass components here are the AC components excluding the DC components of 4×4 blocks obtained by the first frequency conversion in FIG. 5. One DC component and 15 AC components are obtained from one block that has undergone frequency conversion. In FIG. 13D, numbers 1 to 15 are assigned to indicate the positions of the AC components in the arrangement. Targets of high-pass component prediction are AC components {1, 2, 3} or AC components {4, 8, 12} in FIG. 13A. For example, when it is decided to obtain prediction errors of the AC components {1, 2, 3}, the AC components {4, 5, 6, . . . , 15} are excluded from the prediction error calculation process targets.

Figure 14:
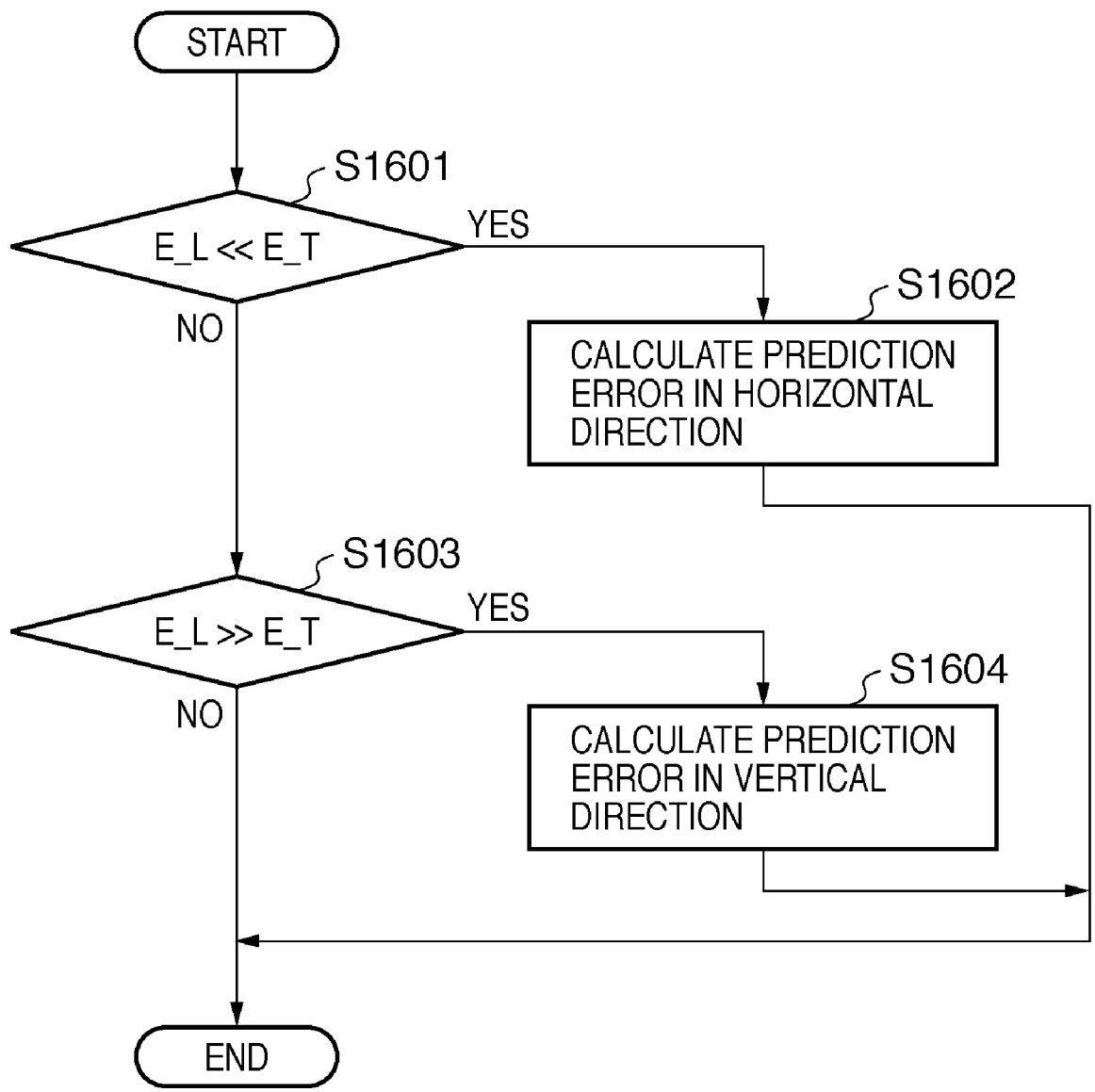
FIG. 14 is a flowchart illustrating the processing procedure of high-pass component prediction processing.

FIG. 14 is a flowchart illustrating high-pass component prediction processing. The processing will be described below with reference to the flowchart.

An energy value E_L of the AC components at the positions {4, 8, 12} of blocks on the left edge of the tile of interest and an energy value E_T of the AC components at the positions {1, 2, 3} of blocks on the upper edge of the tile of interest are obtained. The tile of interest includes 4×4 blocks. The value E_L is the sum of the absolute values of the AC components at the positions {4, 8, 12} of the 16 blocks. The value E_T is the sum of the absolute values of the AC components at the positions {1, 2, 3} of the 16 blocks.

In step S1601, it is determined whether E_L is sufficiently smaller than E_T. It is determined whether $$E\_L-E\_T<Th$$

is satisfied, where Th is a preset positive threshold.

Upon determining that E_L<<E_T, the horizontal direction is decided as the direction of obtaining the prediction errors of the AC components of the block of interest. In step S1602, the coefficient prediction unit 104 scans the AC components at the positions {4, 8, 12} of the blocks in the horizontal direction shown in FIG. 13A, thereby obtaining prediction errors.

If NO in step S1601, the process advances to step S1603 to determine whether E_T is sufficiently smaller than E_L. Using the above threshold Th, it is determined whether $$E\_T-E\_L<Th$$

is satisfied.

Upon determining in step S1603 that E_T<<E_L, the vertical direction is decided as the direction of obtaining the prediction errors of the AC components of the block of interest. In step S1604, the AC components at the positions {1, 2, 3} of the blocks are scanned in the vertical direction shown in FIG. 13B, thereby obtaining prediction errors.

If NO in step S1603, prediction error calculation for the AC components in the macro block of interest is not performed (FIG. 13C).

In the embodiment, one tile includes 6×4 macro blocks. Hence, the header of finally output encoded data of each tile stores information representing "horizontal", "vertical", or "no scan" as the scanning direction of each macro block.

The processing of the coefficient prediction unit 104 has been described above. As the result of prediction processing of the coefficient prediction unit 104, the prediction errors of the DC components, ACDC components, and AC components and a plurality of component values that have not undergone prediction error calculation are output to the coefficient-scanning unit 105.

The coefficient-scanning unit 105 includes a buffer to store the above-described information of one tile. The coefficient-scanning unit 105 zigzag-scans the components (the prediction errors and the components that have not undergone prediction error calculation), like coefficient scanning of JPEG, and rearranges them in the internal buffer. References that disclose HD Photo® or the specifications of HD Photo® give more information on details of this processing, and a detailed description thereof will be omitted here.

The entropy encoder 106 entropy-encodes the values arranged in the internal buffer of the coefficient-scanning unit 105 (assigns Huffman code words).

In the embodiment, as for DC components, the difference between adjacent blocks is calculated and Huffman-coded. As for low-pass components and high-pass components, two-dimensional Huffman coding is performed for each combination of a zero-run random number and a non-zero coefficient in accordance with the zigzag-scanning order. The two-dimensional Huffman coding is executed using the same technique as JPEG.

When entropy encoding of one tile has finished, the code stream generator 107 rearranges encoded data as the result of entropy encoding, and generates a code stream with a header added to the top.

In the embodiment, there are two arrangement modes of the code stream of one tile. One is a spatial mode (spatial sequence code stream), and the other is a frequency mode (resolution sequence code stream).

In the spatial mode, data of macro blocks in a tile are arranged in the raster scanning order, as shown in FIG. 15A. One macro block data contains encoded data of DC components, those of ACDC components, and those of AC components in this order.

In the frequency mode, encoded data of DC components in a tile are arranged first, those of ACDC components are arranged next, and those of AC components are arranged at last, as shown in FIG. 15B. That is, encoded data are arranged from a low frequency to a high frequency.

The format in the spatial mode is convenient for reproducing an original image from the beginning. On the other hand, the latter frequency mode is convenient for reproducing an image having a resolution (intermediate resolution) lower than that of an original image. That is, the frequency mode is suitable for reproducing an image while gradually raising its resolution.

"FLEXBITS" in encoded data of the frequency mode shown in FIG. 15B will briefly be explained. In encoded data of HD Photo®, each of component values (including prediction error values) is divided into an upper bit group and a lower bit group at a predetermined bit position of multiple bits representing the component value. The upper bit group continuously includes the same value at a high probability and therefore undergoes encoding. The values in the lower bit group have no continuity, so no encoding is performed. FLEXBITS includes uncoded data of the lower bits of each of component values (including prediction error values).

In this embodiment, if the above-described code stream formation information CF is "2", a code stream is generated by arranging encoded data in an order according to the frequency mode. If the code stream formation information CF is "1", a code stream is generated according to the spatial mode. Plainly speaking, when encoding an image having a high resolution (the size is L or more in the embodiment), the image has an enormous number of pixels, and the user generally views (decodes) an image having a lower resolution at a high probability. Hence, a code stream is generated in the frequency mode. If the size is smaller than L, a code stream is formed in the spatial mode.

In the embodiment, the frequency mode or spatial mode is decided by determining whether the size is L or less. The determination may be done based on whether the size is M or less. Especially, recent digital cameras are steadily increasing the number of effective pixels, and the number of selectable image sizes is expected to increase from three to four or more. Hence, the user may set the size (number of pixels) as the threshold. In either case, setting information representing a minimum resolution for the spatial mode is held in a nonvolatile memory, and a code stream is generated based on the held information.

Those skilled in the art can easily understand that code stream generation in the spatial mode is relatively simple processing because a code stream can be generated for each macro block. On the other hand, processing in the frequency mode takes a longer time because a code stream can be generated only after the entire tile has been encoded. However, the latter method allows display of a reduced image at the initial stage of decoding/reproduction. It is therefore possible to heighten the value of the application.

Since the frequency mode or spatial mode is uniquely decided for one image, a file header stores information representing which mode is selected. The file header also stores information about the encoding method, such as a QP, prediction method, Huffman coding table, and code stream generation method. A tile header stores information representing the scanning direction in AC component prediction processing.

As described above, according to the first embodiment, the larger the size of a captured image is, the more the frequency converter 102 executes block overlap processing (twice at maximum). This prevents an image reproduced at an intermediate resolution from including noticeable block noise and enables to reproduce a high-quality image.

If the size of a captured image is L or more, a generated code stream has a data structure in the frequency mode. This makes it possible to decode not only the image having the original resolution (4000×3000 pixels in the embodiment) but also an image at an intermediate resolution (1000×750 pixels or about 250×190 pixels in the embodiment) lower than the original resolution. That is, it is possible to decode images at three kinds of resolutions including the original resolution directly from encoded data files without intervening any heavy load processing such as thinning and interpolation processing.

In addition, according to the embodiment, if the high layer mode (a mode in which the encoded data of two kinds of original images having different resolutions are put together into one file) is designated, a total of six kinds of images at the above-described resolutions and also resolutions of 2000× 1500 pixels, 500×375 pixels, and 125×94 pixels can be decoded directly, resulting in higher convenience of the images. To help understanding this point, an example will be explained below in which an information processing apparatus represented by a personal computer makes use of an encoded image data file generated in the above embodiment.

The hardware configuration of an information processing apparatus is well known. Processing of document creation software (application program) executed on the apparatus will be described below. Note that the software is stored in an external storage device such as a hard disk, loaded to a RAM by the CPU, and executed on the OS (Operating System).

Figure 21:
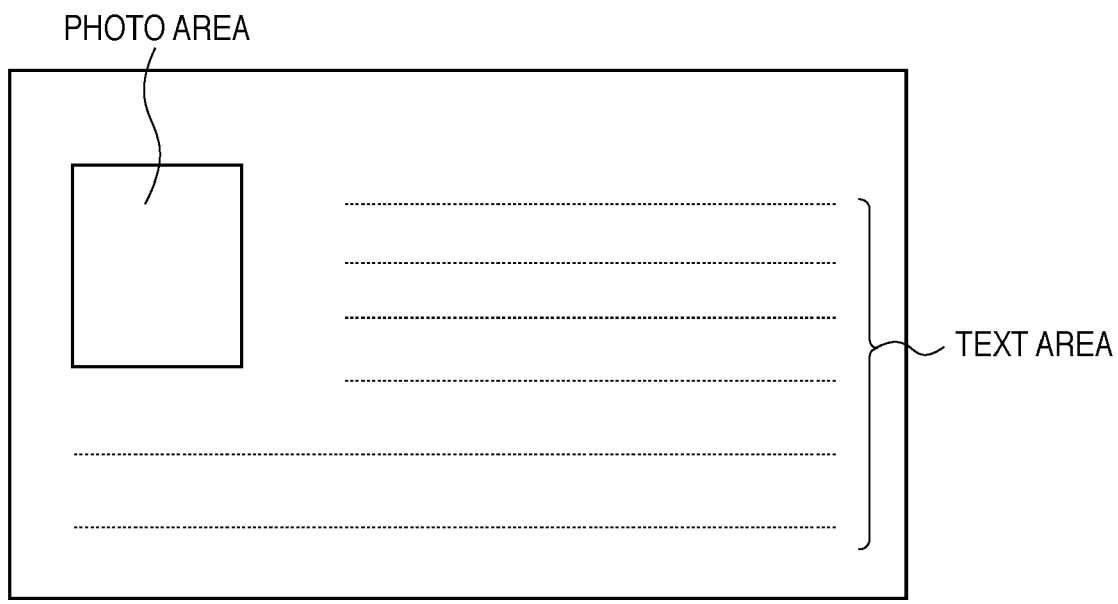
FIG. 21 is an explanatory view of a document format.

In this embodiment, a photo insertion method will be described, which inserts a photo into the output area of a document having a predetermined document format shown in FIG. 21.

Figure 22:
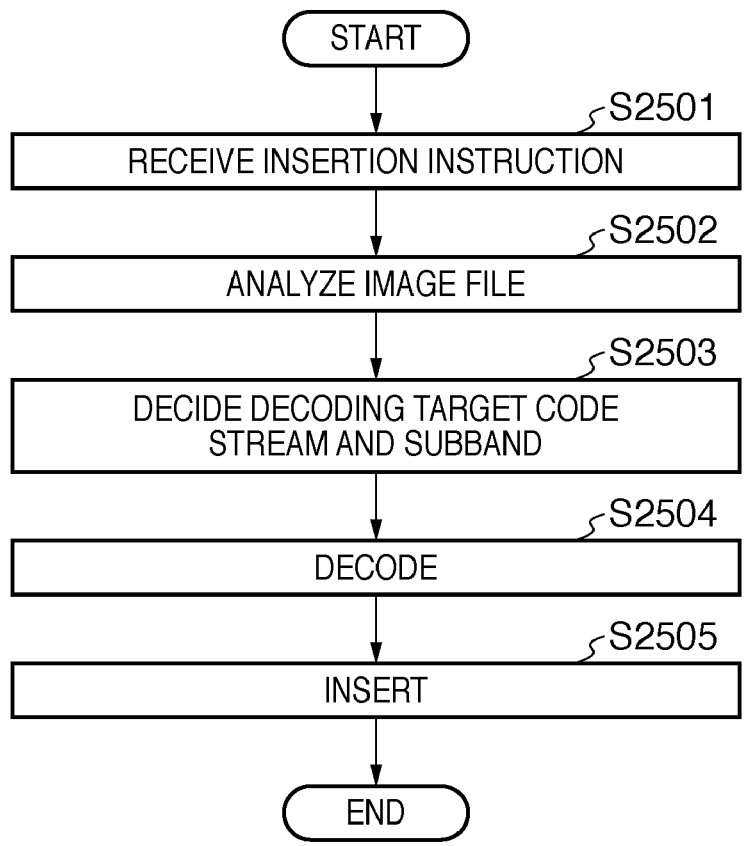
FIG. 22 is a flowchart of document creation software according to the first embodiment.

FIG. 22 is a flowchart illustrating the processing procedure of a part of the software concerning photo insertion processing.

Upon receiving a photo insertion instruction from the user of the document creation software (step S2501), the CPU analyzes the designated encoded image data file (step S2502). To select an insertion target image file, a dialog box or the like is displayed. A list of images is displayed, and an image in it is designated using a pointing device such as a mouse. Alternatively, the file name of the corresponding file including its path may be input from the keyboard.

In the analysis process in step S2502, the header of the designated encoded image data file is analyzed, thereby discriminating resolutions directly decodable from the encoded image data stored in the file. Assume that the original image data has 4000×3000 pixels, and information representing the low layer mode is stored. In this case, three kinds of resolutions are directly decodable, including 4000×3000 pixels obtained by decoding the encoded data of DC, ACDC, and AC components, 1000×750 pixels obtained by decoding the encoded data of DC and AC components, and about 250×190 pixels obtained by decoding only the encoded data of DC components. If the file header stores information representing the high layer mode, one more encoded data (the encoded data of a resized image) of an image having a resolution of 2000×1500 pixels is stored. Six resolutions, i.e., 4000×3000 pixels, 2000×1500 pixels, 1000×750 pixels, 500×375 pixels, about 250×190 pixels, and 125×94 pixels are discriminated to be directly decodable.

After discriminating the decodable resolutions, the CPU decides (specifies) the code stream and frequency band of the decoding process target based on the discrimination result (step S2503). A code stream having a minimum decodable resolution not less than the size (set by the user) of the image insertion area of the insertion target document is preferentially decided as the decoding target.

For example, if the photo insertion area of the document has a size of 4000×3000 pixels or more, a code stream necessary for decoding the 4000×3000 pixels of the original image is decided as the decoding target.

If the photo insertion area of the document has a size of 400×300 pixels, one of the following processes is performed.

(1) If the header of the encoded image data file stores information representing the low layer mode, encoded data necessary for decoding image data with 1000×750 pixels is decided as the decoding target.

(2) If the header of the encoded image data file stores information representing the high layer mode, encoded data necessary for decoding image data with 500×375 pixels is decided as the decoding target.

When the code stream corresponding to the frequency band of the decoding target is decided in the above-described way, the CPU performs decoding processing based on the code stream (step S2504). When the decoding processing has ended, and the decoded image is generated, the decoded image is resized (thinned out in many cases) in accordance with the size of the insertion area. Then, the decoded image is inserted (step S2505).

Figure 18:
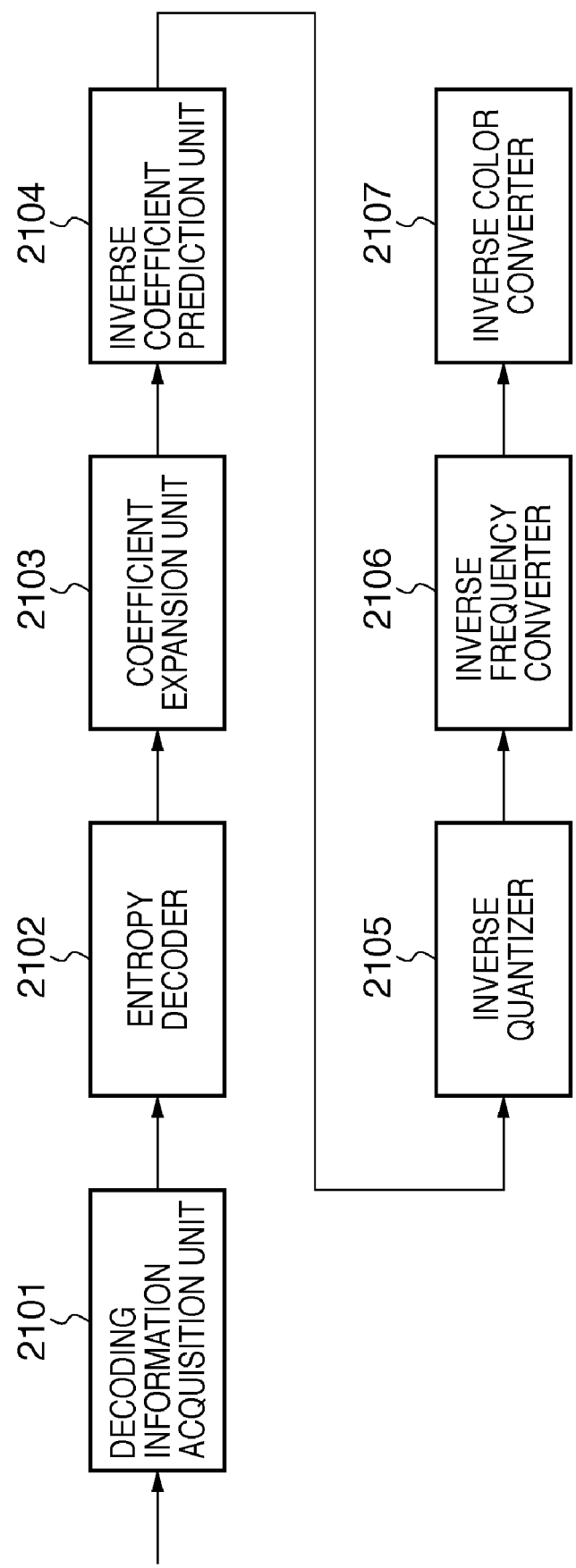
FIG. 18 is a block diagram showing the arrangement an image decompression unit according to the embodiment.

FIG. 18 shows the arrangement (decoding apparatus) which implements the decoding processing in step S2504 by hardware. Regarding the hardware as a card mounted on a bus (e.g., PCI bus) of the information processing apparatus gives a better understanding. The hardware is also mounted in the above-described digital camera. This is because a digital camera normally has a function of decoding and displaying an image file which is photographed and stored in a memory card.

As shown in FIG. 18, the decoding apparatus includes a decoding information acquisition unit 2101, entropy decoder 2102, coefficient expansion unit 2103, inverse coefficient prediction unit 2104, inverse quantizer 2105, inverse frequency converter 2106, and inverse color converter 2107.

Upon receiving a code stream, the decoding information acquisition unit 2101 analyzes the header information of the code stream. With this analysis processing, the decoding information acquisition unit 2101 acquires information about the encoding conditions such as FLEXBITS information, code stream sequence information (frequency/spatial), quantization parameter information, and overlap information. The decoding information acquisition unit 2101 also receives information to designate a decoding target code stream (decoding target code stream decided in step S2503). The designated code stream is output to the entropy decoder 2102 of the succeeding stage. That is, code streams other than the designated one are not output to the entropy decoder 2102.

The entropy decoder 2102 entropy-decodes the received code stream and outputs the decoding result to the coefficient expansion unit 2103. Since the coefficients have been rearranged by coefficient scanning at the time of encoding, the coefficient expansion unit 2103 performs inverse processing to return the coefficient order to the raster scanning order. The inverse coefficient prediction unit 2104 performs an operation reverse to the prediction operation at the time of encoding based on quantization step information or the like, thereby generating quantization indices (quantized coefficients). The inverse quantizer 2105 performs inverse quantization of the quantization indices to generate coefficients. The inverse frequency converter 2106 performs processing reverse to that of the flowchart in FIG. 3 to generate color conversion data. The inverse color converter 2107 performs inverse color conversion of the color conversion data, thereby generating a decoded image.

To obtain an image having a resolution desired by the user, an image having a minimum resolution equal to or more than the target resolution is preferably decoded first. This is because to generate a reduced image having the target resolution from a decoded image, interpolation and thinning need to be performed for the reduction processing, and the process amount is proportional to the number of pixels of the decoded image data. In this point of view, according to this embodiment, six kinds of resolutions are directly decodable from encoded image data when the high layer mode is designated. It is possible to decode an image whose amount of processing for reduction is smaller. This enables to decrease the process amount necessary for obtaining the target resolution.

In the embodiment, the maximum resolution of the digital camera has been described as 4000×3000 pixels. This is merely an example, and the present invention is not limited to this resolution. Additionally, in the embodiment, a macro block has a size of 4×4 blocks. The present invention is not limited to this, either. The intermediate resolution is decided by the macro block size, and the embodiment exhibits a mere example. This also applies to the second and subsequent embodiments.

[Second Embodiment]

In the first embodiment, an example has been described in which when inserting an image on the document creation, the decoding target code stream is decided based on the size of the image to be inserted.

Image files managed by the document creation software can also include image files without code streams of resized images, i.e., image files in the low layer mode. Existence of such an image file leads to the conclusion that the later editing operation of the document creation software takes a longer time. In the second embodiment, encoded image data files in the low layer mode are detected and updated once together to image files in the high layer mode.

Figure 23:
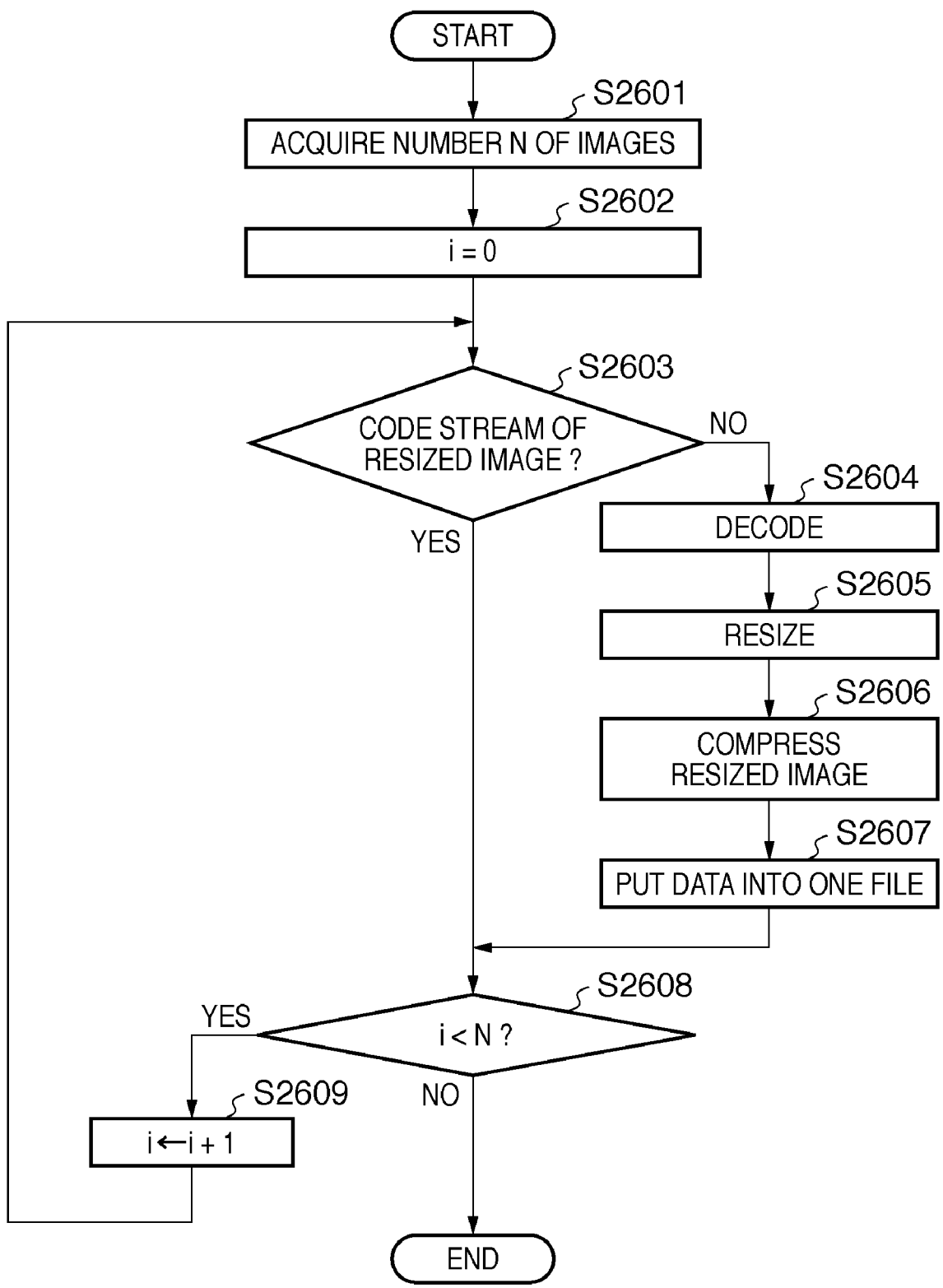
FIG. 23 is a flowchart of document creation software according to the second embodiment.

FIG. 23 shows the processing procedure of document creation software according to this embodiment. When the user has instructed to convert encoded image data into data in the high layer mode, the number (N) of encoded image data files stored in a storage device (hard disk) and managed by the document creation software is counted (step S2601). After the end of counting, a counter i is set to 0 (step S2602).

The header field of the ith encoded image data file is analyzed to check the presence/absence of a resized image (step S2603). More specifically, it is determined whether the layer mode stored in the file header is the low layer mode.

If the image file of interest stores the encoded data of resized image data, the file need not be updated, and the process advances to step S2608. The counter i is compared with the number N of files. If i<N, an unchecked file exists. Hence, the variable i is incremented by "1" in step S2609, and the process returns to step S2603.

If it is determined in step S2603 that the ith encoded image data file contains no resized image, i.e., the layer mode stored in the file header is the low layer mode, the process advances to step S2604. In step S2604, the decoding processing is temporarily performed up to the original image (maximum resolution). The decoding method is the same as that described in the first embodiment, and a description thereof will not be repeated here. In step S2605, resized image data is generated from the decoded image data. In this embodiment, an image having a ½ resolution is generated from image data having a resolution of 4000×3000 pixels as a resized image. Hence, the resized image has a resolution of 2000×1500 pixels.

The process advances to step S2606 to compression-code the resized image. The compression-coding is the same as that described in the first embodiment, and a description thereof will not be repeated here. After generation of the encoded data of the resized image, the encoded data of the resized image data is stored in the encoded data file of the original image, thereby updating the image file (step S2607). At this time, information representing the high layer mode is also stored in the file header. The counter i is compared with the number N of encoded image data (step S2608). If the counter i is smaller, the process in step S2609 is executed, and then, the processing is repeated from step S2603.

When it is determined in step S2608 that all image files of the management target have undergone the processing, the processing ends.

As described above, it is possible to convert a plurality of image files into those in the high layer mode by only one operation. This raises the efficiency of the later editing operation.

Note that the above-described function may be imparted to a digital camera. More specifically, the files of image data which are temporarily captured in the low layer mode and stored in a memory card may be updated into the image data file format of the high layer mode in accordance with a user instruction.

[Third Embodiment]

In the first embodiment, a method of inserting a photo into a document has been described. In the third embodiment, layout print processing of encoded image data managed by document creation software will be described.

Figure 24:
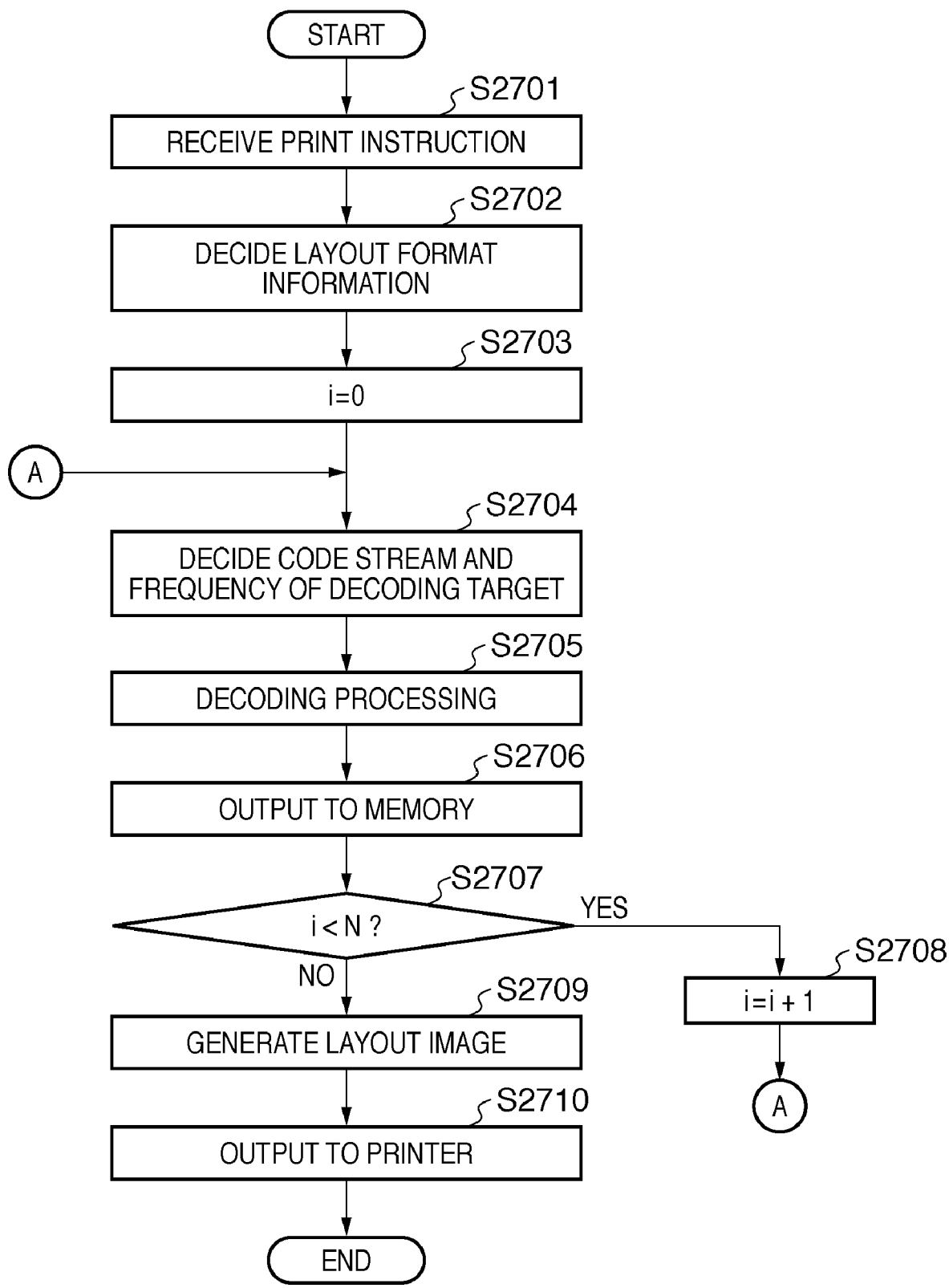
FIG. 24 is a flowchart illustrating print image generation processing according to the third embodiment.

FIG. 24 is a flowchart of list print processing (called N-in-1 printing in general) of document creation software according to the third embodiment. The processing will be explained below with reference to FIG. 24.

In step S2701, the CPU receives an instruction of encoded image data files (the number of image files is N) to be printed and a print instruction from the user. Upon receiving the instructions, the CPU decides, based on the size of printing paper sheets loaded on the printer and the number N of designated images, the layout information of images to be printed on one printing paper sheet (step S2702). The layout information contains the numbers of images in the horizontal and vertical directions on a printing paper sheet and the print size of each image (corresponding to the photo insertion area size in the second embodiment).

In step S2703, the CPU clears a variable i to "0".

The CPU analyzes the ith image file and decides a code stream and frequency to decode an image having a minimum resolution not less than the print size (step S2704).

Step S2704 will be described below in more detail.

As described in the first embodiment, the original resolution of an image file photographed by a digital camera according to this embodiment can have one of three sizes L, M, and S. The code stream necessary for decoding an image having a minimum resolution not less than the print size therefore depends on the L, M, and S.

In step S2705, the code stream decided as the decoding target is read out and decoded. Image data obtained by decoding is temporarily output to and held in the RAM or the hard disk of the personal computer (step S2706).

The process advances to step S2707 to compare the counter value i with the number N of images. If i<N, the counter value i is incremented by "1" in step S2708, and the process returns to step S2704.

If it is determined in step S2707 that i=N, the images to be printed in a list have been decoded. The process advances to step S2709 to lay out the decoded image data in accordance with the layout decided in advance. Decoded images larger than the print size are resized to the print size.

Then, in step S2710, the layout result is output to the printer and printed.

As can easily be understood from the above explanation, the load on the CPU during the print processing is heaviest in the decoding processing in step S2705. This means that the less the encoded data amount to be used for decoding processing is, the faster the decoding processing is. As described above, in this embodiment, the number of directly decodable image sizes of an image data file encoded in the high layer mode is larger than that of an image data file decoded in the low layer mode. For this reason, when the print size of an image to be printed in a list is decided, a resolution close to the print size can be found more easily in an image file in the high layer mode than in an image file in the low layer mode, minimizing the load in decoding.

[Fourth Embodiment]

In the first to third embodiments, an example in which the encoding processing unit is provided in a digital camera has been described. In an example to be described in the fourth embodiment, the encoding processing unit is applied to an image scanner which reads a document mage. In this case, the encoding processing unit can be either provided inside the image scanner or implemented by a scanner driver installed in a personal computer or the like. The fourth embodiment will be described assuming the former case.

As is generally known, the standard paper sizes of documents (sheets) are A and B sizes. Their aspect ratios are not "1". For example, an A4 sheet that is an A-sized sheet has a size of about 21×30 cm. This aspect ratio is common to the remaining A sizes. This also applies to the B sizes.

For the descriptive convenience and simplicity of image processing, an explanation will be made assuming that the aspect ratio of a document is 3:4.

Assume that two document pages each having a size of "1" are read, and the two read document images are printed in a 2-in-1 format on a printing paper sheet having the same size. To read two document pages and print the two images on one printing paper sheet having the same size with a minimum margin area, the two document images are reduced in both the horizontal and vertical directions at a reduction ratio of "3/4" and rotated by 90°. For example, the 3/4 size of an A4 document is approximately 15×20 cm. Rotating the two reduced images by 90° enables them to be laid out on one A4 printing paper sheet. In an 8-in-1 format, images are laid out in 2 rows×4 columns. In this case as well, rotation is necessary for minimizing the margin.

When printing four images in a 4-in-1 format (2 rows×2 columns layout), the images are reduced to ½ in both the horizontal and vertical directions but need not be rotated. In a 9-in-1 format (3 rows×3 columns layout), the images are reduced to ⅓ in both the horizontal and vertical directions but need not be rotated. This also applies to a 16-in-1 format.

In this regard, the necessity of rotation of N images in an N-in-1 format can specifically be decided in the following way. N is factored to obtain N=N1×N2 (N1 and N2 are positive integers). The aspect ratio (first aspect ratio) of one cell is obtained by equally dividing the horizontal length (e.g., widthwise length) of the document into N1 parts and the vertical length (longitudinal length) into N2 parts. Reversely, the aspect ratio (second aspect ratio) of one cell is obtained by equally dividing the horizontal length of the document into N2 parts and the vertical length into N1 parts. Which one of the first and second aspect ratios approximates to the aspect ratio of the document size (or its reciprocal) decides the layout and the necessity of rotation.

Examine a case in which read document image data is stored and managed as a compression-coded file and printed in accordance with a user instruction.

To print one image on one printing paper sheet, image data having its original resolution is decoded and directly printed, as can easily be understood.

To print images in a 2-in-1 or 8-in-1 format, image data having a ¾ size of the original image at maximum in both the horizontal and vertical directions is generated, rotated by 90°, and then encoded. This saves the CPU from having to rotate the images at the time of printing and minimizes the load on it. The print processing can also speed up.

To print images in a 4-in-1 or 9-in-1 format, image data having a ½ size of the original image at maximum resolution in both the horizontal and vertical directions is generated and encoded without rotation. This minimizes the load on the CPU at the time of printing.

The fourth embodiment will be described in consideration of the above principle.

Figure 25:
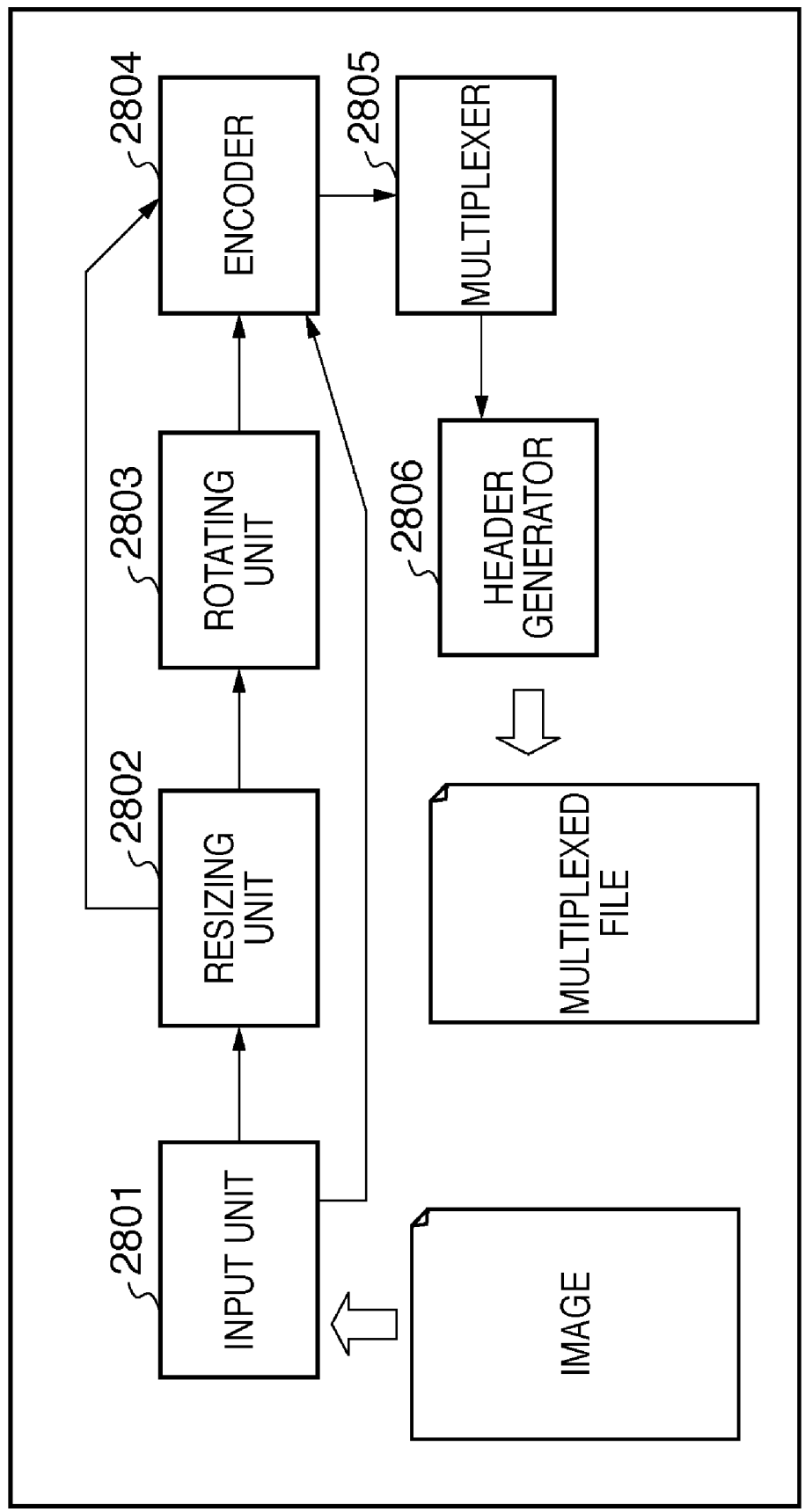
FIG. 25 is a block diagram showing the arrangement of a scanner according to the fourth embodiment.

FIG. 25 is a block diagram showing the arrangement of an image scanner device according to the fourth embodiment.

This device includes an input unit 2801 which receives document image data (to be simply referred to as image data hereinafter) from a scanning unit (not shown), a resizing unit 2802, a rotating unit 2803, an encoder 2804, a multiplexer 2805, and a header generator 2806 which generate an encoded data file and its file header. The generated encoded image data file is transmitted to a host computer. However, the output destination of the encoded image data file is not limited to this, and it may be stored in a storage medium such as a memory card.

Upon receiving image data, the input unit 2801 outputs it to the resizing unit 2802 and the encoder 2804. The resizing unit 2802 generates two image data having ½ and ¾ resolutions in both the horizontal and vertical directions based on the received image data. The image data having ½ and ¾ resolutions relative to the original image data will simply be referred to as "½ resolution image data" and "¾ resolution image data" hereinafter.

The resizing unit 2802 outputs the ½ resolution image data to the encoder 2804 and the ¾ resolution image data to the rotating unit 2803. The rotating unit 2803 rotates the received ¾ resolution image data by 90° and outputs the rotated ¾ resolution image data to the encoder 2804.

The encoder 2804 having the arrangement in FIG. 1 described in the first embodiment encodes the received original image data, the ½ resolution image data, and the rotated ¾ resolution image data and outputs them to the multiplexer 2805. The multiplexer 2805 concatenates the received encoded image data having the three kinds of resolutions in a preset order and outputs the concatenated data to the header generator 2806. The header generator 2806 adds a file header to the encoded data received from the multiplexer 2805. At this time, the header generator 2806 stores, in the file header, multi-layer mode information representing that the data contains images at three resolutions and the start address positions (bit positions) of the encoded data having the original resolution, ½ resolution, and ¾ resolution, and outputs the data as one file.

Figure 26:
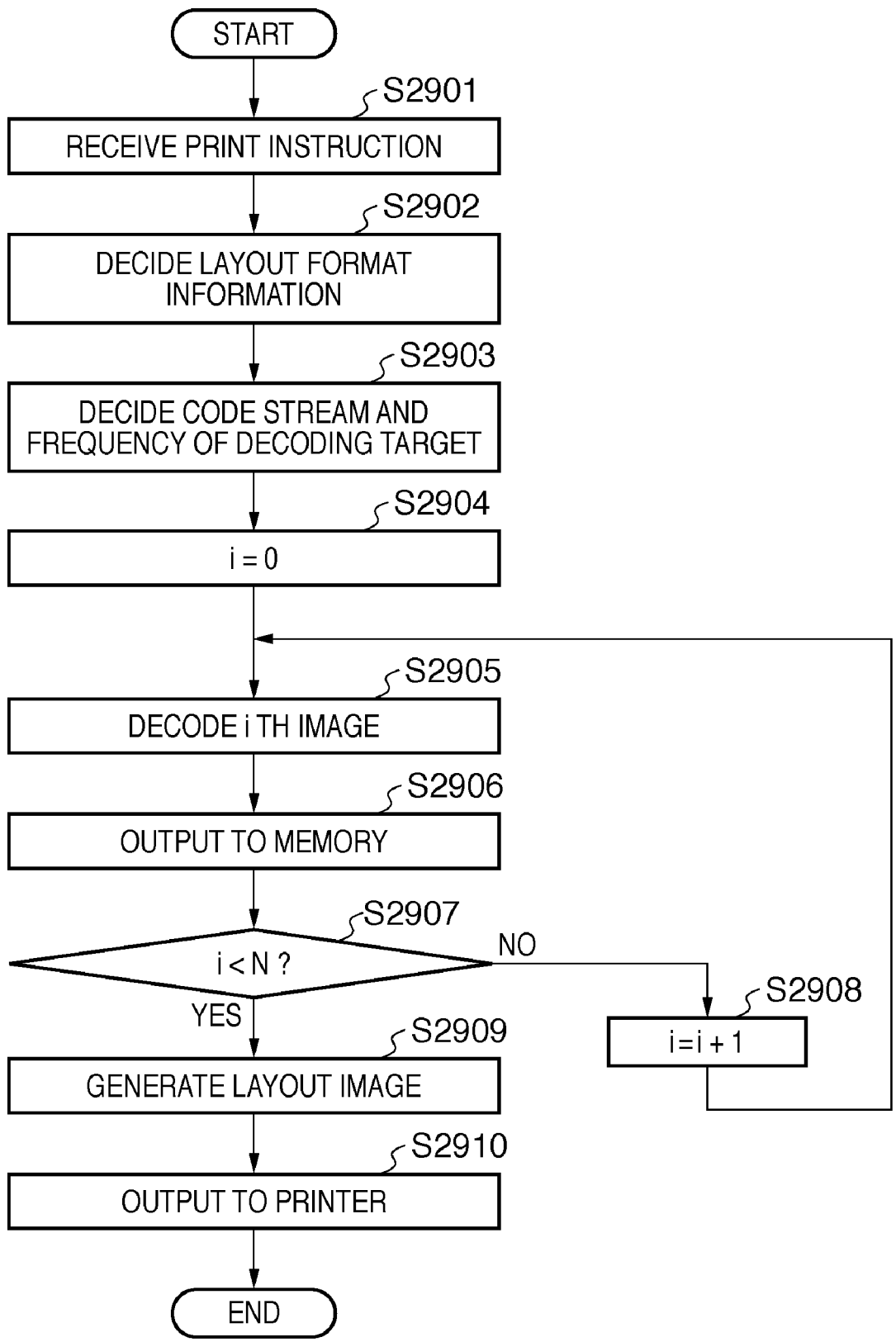
FIG. 26 is a flowchart illustrating the processing procedure of print image generation according to the fourth embodiment.

Print processing in the host computer will be explained next with reference to the flowchart in FIG. 26. For the sake of simplicity, print processing of 2-in-1 and 4-in-1 formats will be described. Assume that print target image files are already stored in a storage device such as the hard disk of the host computer.

First, in step S2901, the CPU receives an instruction of image files (the number of image files is N) to be printed and a print format (N of N-in-1) instruction from the user. Upon receiving the instructions, the CPU decides, based on the size of printing paper sheets loaded on the printer and the number N of designated images, the layout information of images to be printed on one printing paper sheet (step S2902). The layout information contains the numbers of images in the horizontal and vertical directions on a printing paper sheet and the print size of each image (corresponding to the photo insertion area size in the second embodiment).

In step S2903, the CPU selects, based on N of N-in-1, the decoding target from the encoded data having the original resolution, ½ resolution, and ¾ resolution in the encoded data file.

After that, the CPU clears a variable i to "0" in step S2904.

The CPU analyzes the ith image file and decodes the decoding target image data decided above, thereby generating decoded image data (step S2905). The CPU outputs the generated decoded image data to the RAM or the hard disk of the personal computer and holds the data in it (step S2906).

The process advances to step S2907 to compare the counter value i with the number N of images. If i<N, the counter value i is incremented by "1" in step S2908, and the process returns to step S2905.

If it is determined in step S2907 that i=N, the images to be printed in a list have been decoded. The process advances to step S2909 to lay out the decoded image data in accordance with the layout decided in advance.

Then, in step S2910, the layout result is output to the printer and printed.

Figure 27:
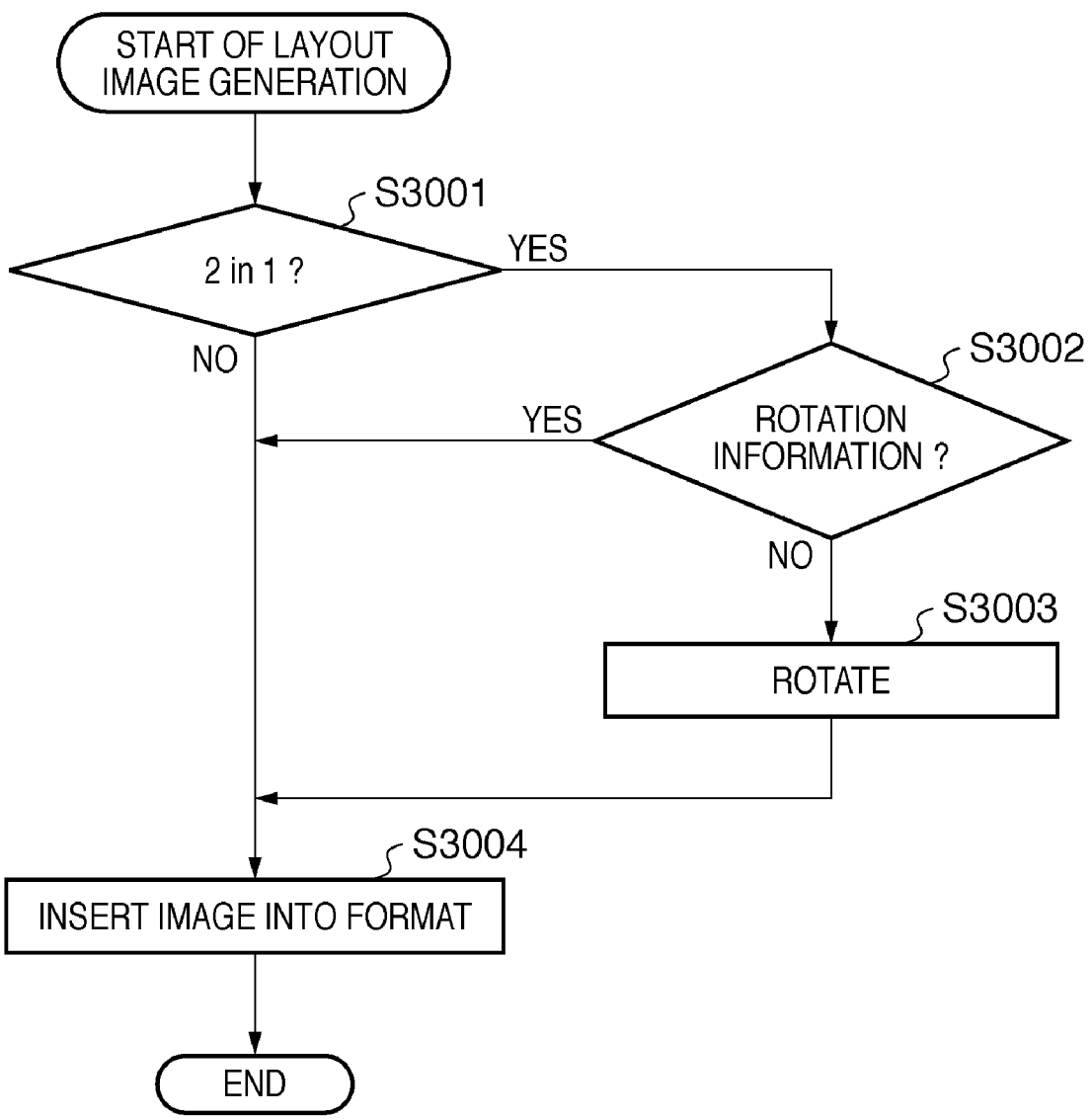
FIG. 27 is a flowchart illustrating the processing procedure of print image generation according to the fourth embodiment.

The layout processing in step S2909 will be described with reference to the flowchart in FIG. 27.

In step S3001, it is determined whether the format designated for printing is 2-in-1. If the format is not 2-in-1, i.e., if the format is 4-in-1, the decoded images are directly inserted into the 2-in-1 format. If the format is 2-in-1, process advances to step S3002 to check the header of the encoded image data file of interest and determine whether there is information representing an already rotated resized image. Step S3002 is inserted to deal with a case in which the encoded image data file designated as the print target in the 2-in-1 format is generated without the above-described rotation processing. If it is determined that rotation processing is not performed, the process advances to step S3003 to rotate the decoded image data by 90°.

An example of 2-in-1 and 4-in-1 has been described above. To cope with, e.g., the 8-in-1, 9-in-1, or 16-in-1 format, in step S2905, a code stream which is required to obtain an image having a minimum resolution (the number of pixels) not less than the print size of one image determined by N-in-1 and needs no rotation processing is decided as the decoding target and decoded. After that, the decoded image data is resized to the size of the print area.

As described above, according to the fourth embodiment, it is possible to generate a file that multiplexes the encoded data of original image data, the encoded data of images to be printed after 90° rotation, and the encoded data of images without rotation. This reduces the load on the CPU or the like when printing an N-in-1 format and increases the speed of print processing.

In the above-described first to third embodiments, no rotation processing is performed. However, resized image data may be rotated by the image processing unit 2203 and then encoded.

[Fifth Embodiment]

Several recent digital cameras detect the orientation of the main body and incorporate the orientation information in the file of a compression-coded photographed image. This aims at displaying an erect image on the liquid crystal display device of the digital camera or a PC.

However, even if the file stores the orientation information, when the processing unit of a digital camera is going to display an erect image on the liquid crystal display unit, or when the CPU of a PC is going to display an erect image on the display screen, the image needs to be rotated.

In the fifth embodiment, a method will be explained in which a device compresses and stores an original image and a rotated resized image in accordance with the orientation at the time of image capturing, and decodes an optimum code stream for a resolution after determining its own orientation at the time of display.

Figure 28:
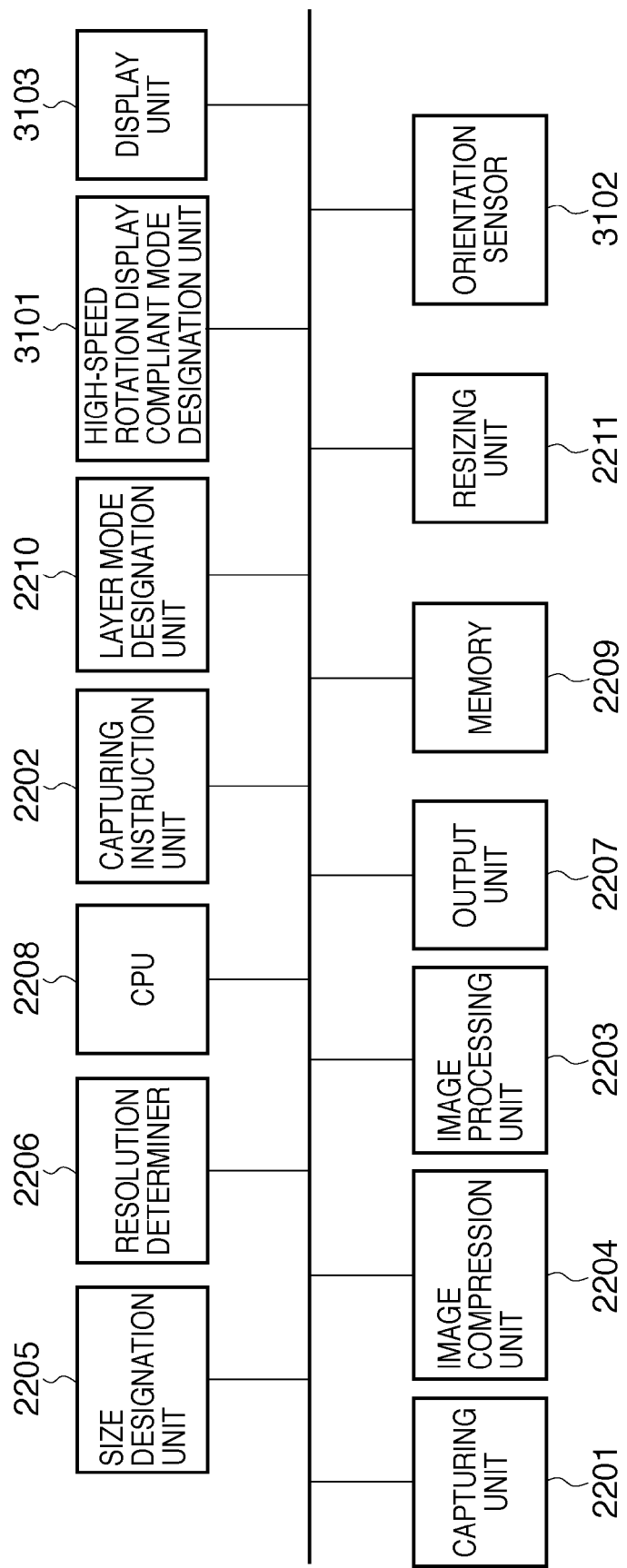
FIG. 28 is a block diagram showing the arrangement of a digital camera according to the fifth embodiment.

FIG. 28 is a block diagram of a digital camera according to the fifth embodiment. FIG. 28 is based on the block diagram (FIG. 19) of the first embodiment. The same reference numerals as in FIG. 19 denote parts having the same functions in FIG. 28, and a description thereof will not be repeated. FIG. 28 is different from FIG. 19 in that a high-speed rotation display compliant mode designation unit 3101 replaces the layer mode designation unit 2210, and an orientation sensor 3102 for detecting the orientation of the digital camera and a display unit 3103 are newly added.

Figure 29:
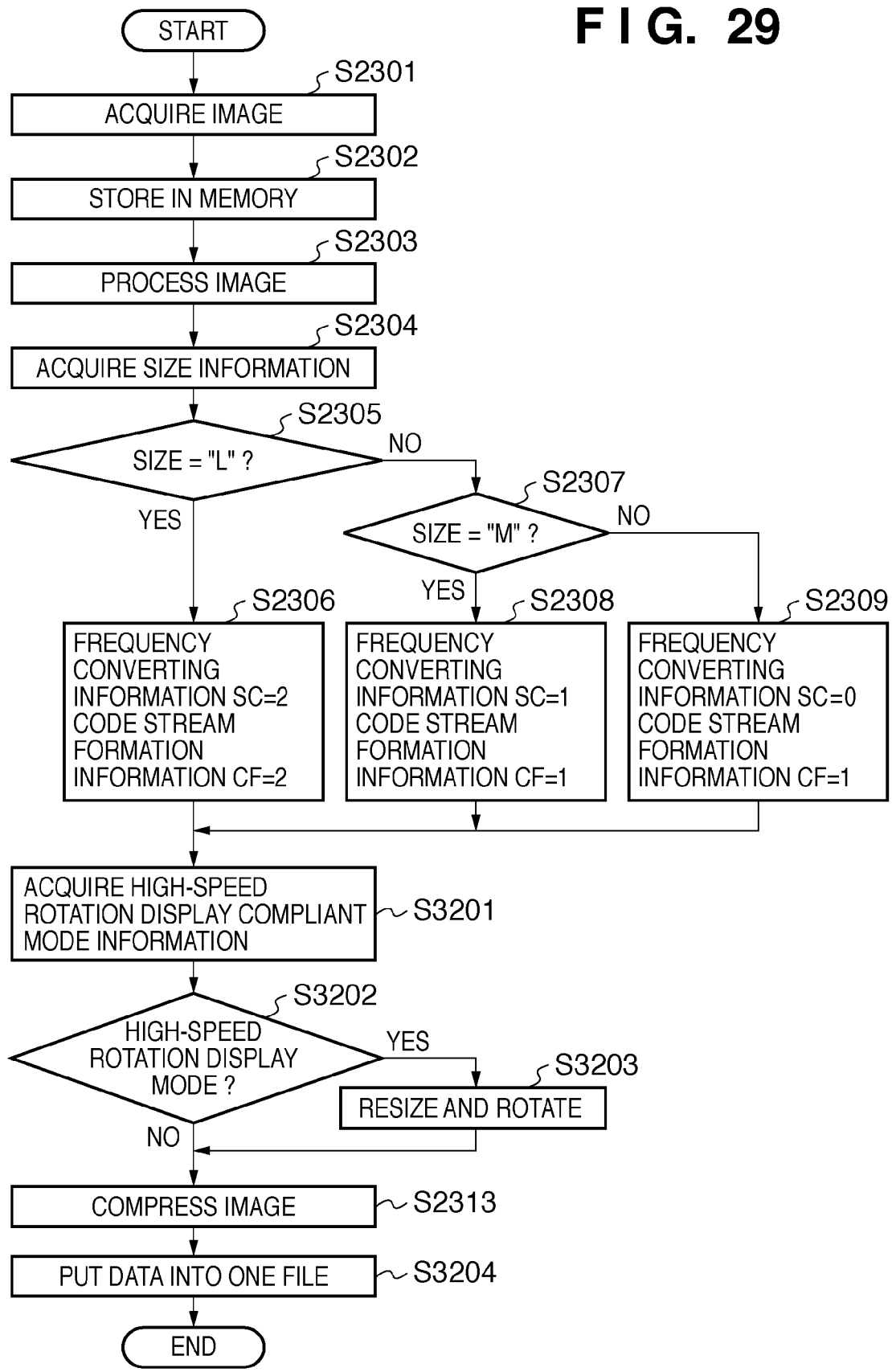
FIG. 29 is a flowchart of the digital camera according to the fifth embodiment.

FIG. 29 shows the processing procedure of a digital camera system having the arrangement shown in the block diagram of FIG. 28. The same step numbers as in the processing procedure (FIG. 20) of the digital camera system according to the first embodiment represent the same processes in FIG. 29. Different processes are steps S3201, S3202, S3203, and S3204. Hence, processes from step S3201 will be explained below.

When frequency converting information SC and code stream formation information CF are decided after captured image acquisition, as in the first embodiment, the process advances to step S3201. In step S3201, mode information (stored in a memory 2209) set by the high-speed rotation display compliant mode designation unit 3101 is acquired. If the high-speed rotation display compliant mode is OFF (NO in step S3202), the captured image (original image) is transferred to the image compression unit. If the high-speed rotation display compliant mode is ON (YES in step S3202), the original image is copied. The copied image is resized and rotated to generate a rotated image (resized image) (step S3203). The resizing ratio is decided based on the image size and the display area size. Assume that the captured original image has 4000×3000 pixels, and the resolution of the display area of the display unit 3103 is 640 horizontal pixels×480 vertical pixels.

To display an image captured in a portrait orientation (with the camera body set vertically) and, more particularly, to display the portrait image while making the most of the display unit 3103, it is necessary to generate an image having a size of 480×360 pixels. That is, an image having a size of 480×360 pixels is generated from an image having a size of 4000×3000 pixels. An image having this size may be regarded as an original image for rotation display. However, this applies to only the display unit 3103 of the camera. The size is too small to display on, e.g., a PC. In the fifth embodiment, an image is resized to the quadruple of this size, i.e., 1920×1440 pixels, and rotated. When a CPU 2208 is to display an erect portrait image on the display unit 3103, the image is resized after the encoded data of DC and ACDC components are decoded.

When the resizing and rotation processing has finished, the process advances to step S2313 to compress the original image and the resized image. After the image compression processing, information representing the presence/absence of the resizing and rotation processing is stored in the header. The original image and the resized image are multiplexed into one file and output.

Figure 30:
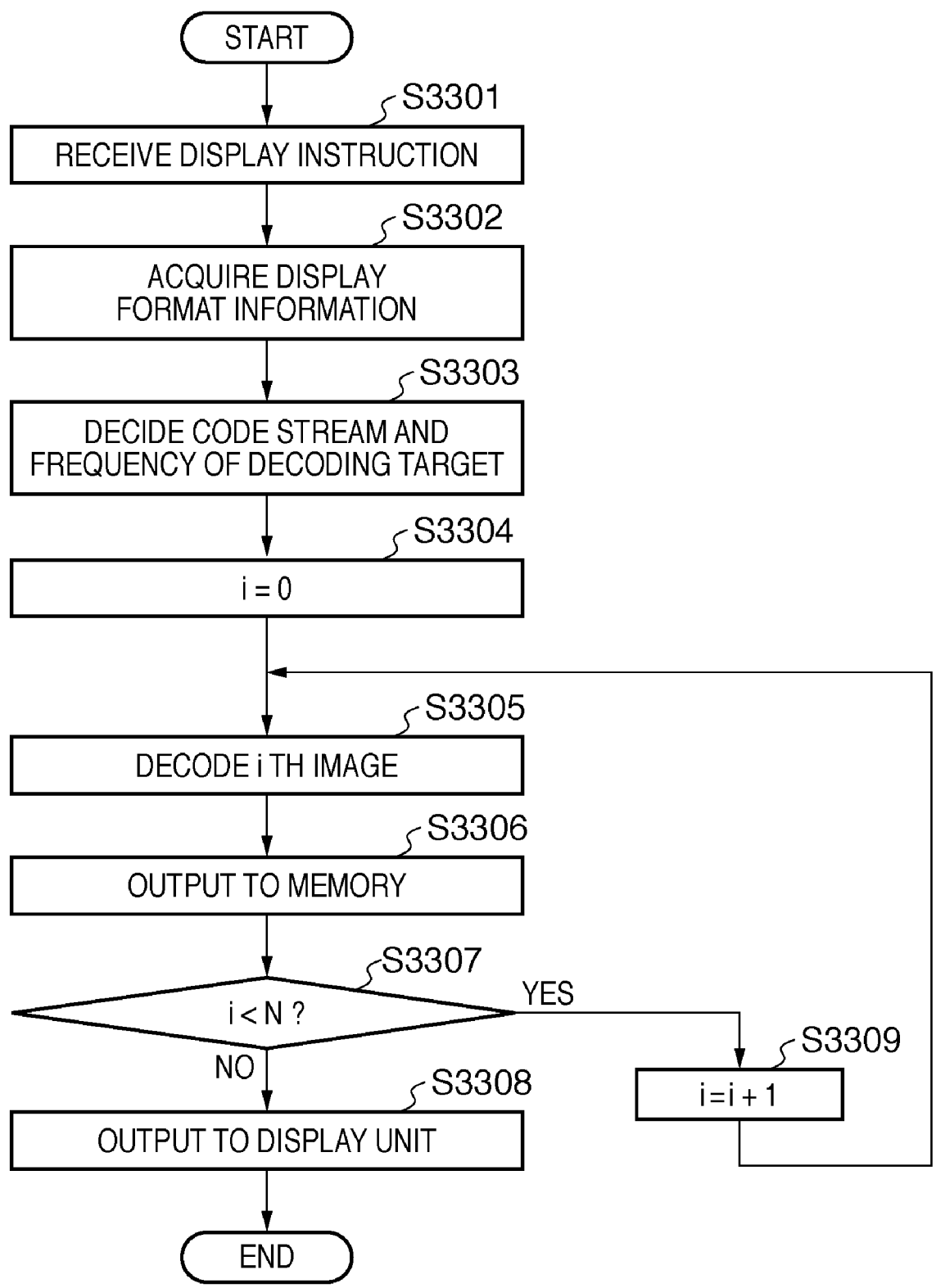
FIG. 30 is a flowchart of the digital camera according to the fifth embodiment.

A method of displaying an image on the liquid crystal display screen of the main body will be explained next. Referring to the flowchart in FIG. 30, when the user instructs to display a captured image on the display screen of the display unit 3103 (liquid crystal display unit in general) (step S3301), the CPU acquires display format information (step S3302). The display format is 1-in-1 or 4-in-1. After acquiring the display format information, the CPU decides the code stream and frequency band of the decoding target (step S3303). This step will be described later in more detail. When the code stream and frequency band of the decoding target are decided, the CPU sets the number N of images of the decoding target and the counter i of the number of decoded images to 0 (step S3304). The ith image is then decoded (step S3305) and output to the memory 2209 (step S3306). In step S3307, the CPU determines whether i<N. If it is determined that i<N, the process advances to step S3309 to increment i by "1". Then, the process returns to step S3305. If it is determined in step S3307 that i=N, the decoded images accumulated in the memory 2209 are output to and displayed on the display unit 3103 (step S3308).

Figure 31:
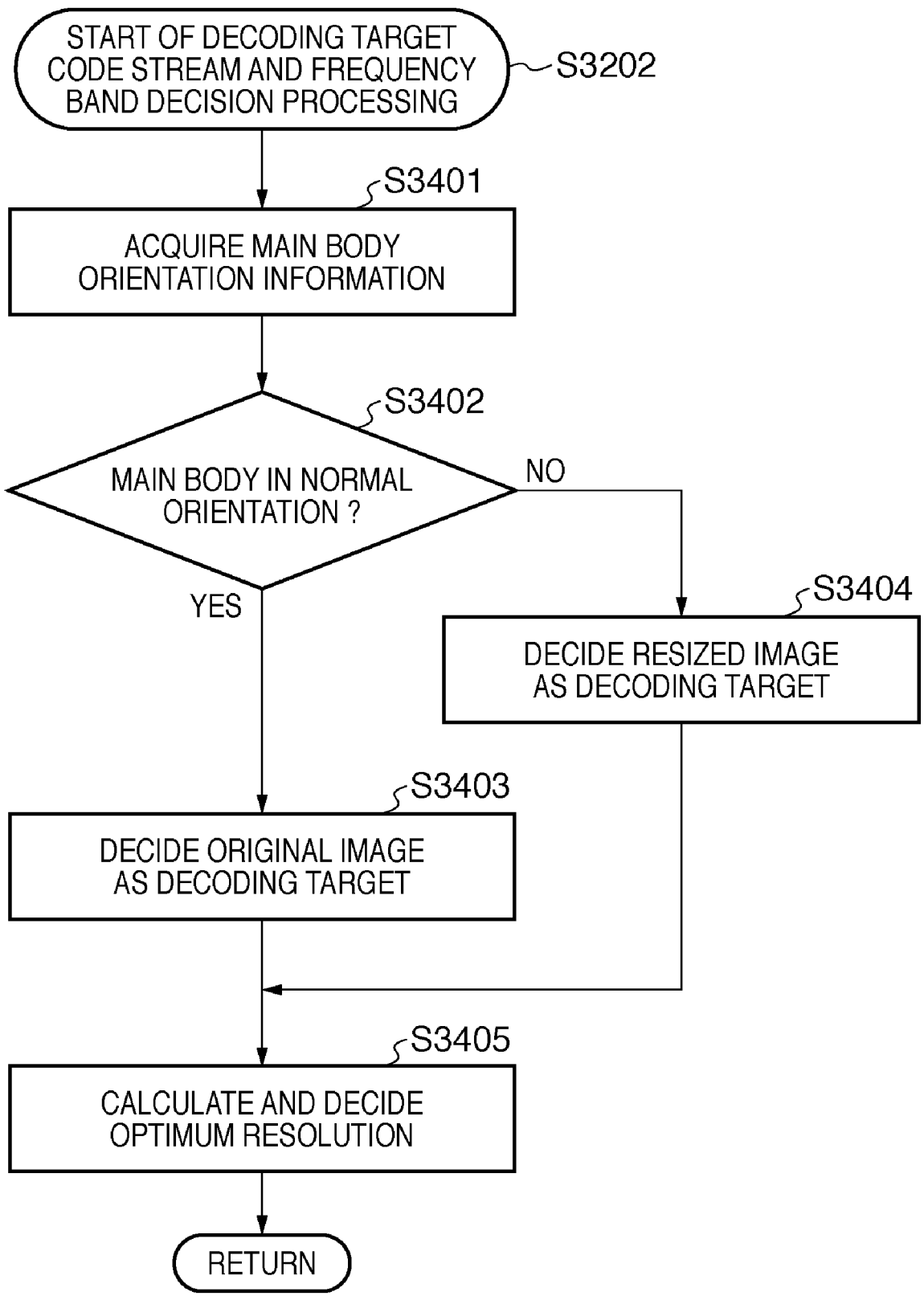
FIG. 31 is a flowchart of the digital camera according to the fifth embodiment.

Step S3302 will be described next in more detail with reference to the flowchart in FIG. 31.

When the process advances to step S3302, the CPU acquires the current orientation of the digital camera body from the orientation sensor 3102 (step S3401). If the main body orientation is the normal orientation (an orientation to capture a landscape image) (YES in step S3402), the original image is decided as the decoding target (step S3403). If the digital camera body has an orientation to capture a portrait image, the resized image is decided as the decoding target (step S3404). After deciding the decoding target image, the CPU decides the optimum frequency band of the decoding target based on the display format acquired in step S3302 (step S3405). The decision method is the same as in the first embodiment.

As described above, a resized image is rotated, compressed, and stored. This makes it possible to smoothly display an optimum image regardless of the orientation of the camera main body, portrait or landscape orientation.

[Sixth Embodiment]

In the fifth embodiment, photographing and display are done in a single device. In the sixth embodiment, an image storage method when the image sensing device and the display device are different will be described. More specifically, assume a server/client system which receives an image captured by a digital camera or a cellular phone and uploaded via a network (Internet) and transmits the stored image to a client device in response to a request. The liquid crystal display area changes depending on the client device. For this reason, an uploaded image is not always suitable for the display area of a device that has downloaded the image. The server according to the sixth embodiment resizes an uploaded image to a size capable of coping with the request source device and then compression-codes it. Also assuming that the receiving-side device rotates the image to be displayed, a rotated image is also put together into one file and transmitted. The temporarily resized image data is stored in correspondence with the original image. This aims at using the resized and compression-coded file upon receiving a request from a device having the same resolution.

The server has a database (formed from a storage device such as a hard disk) to store and manage a number of image files in advance. For the descriptive convenience, an image represented by each image file stored in the database is assumed to have a resolution of 4000 horizontal pixels×3000 vertical pixels. Image data to be registered in the database is uploaded from a connected terminal.

Figure 32:
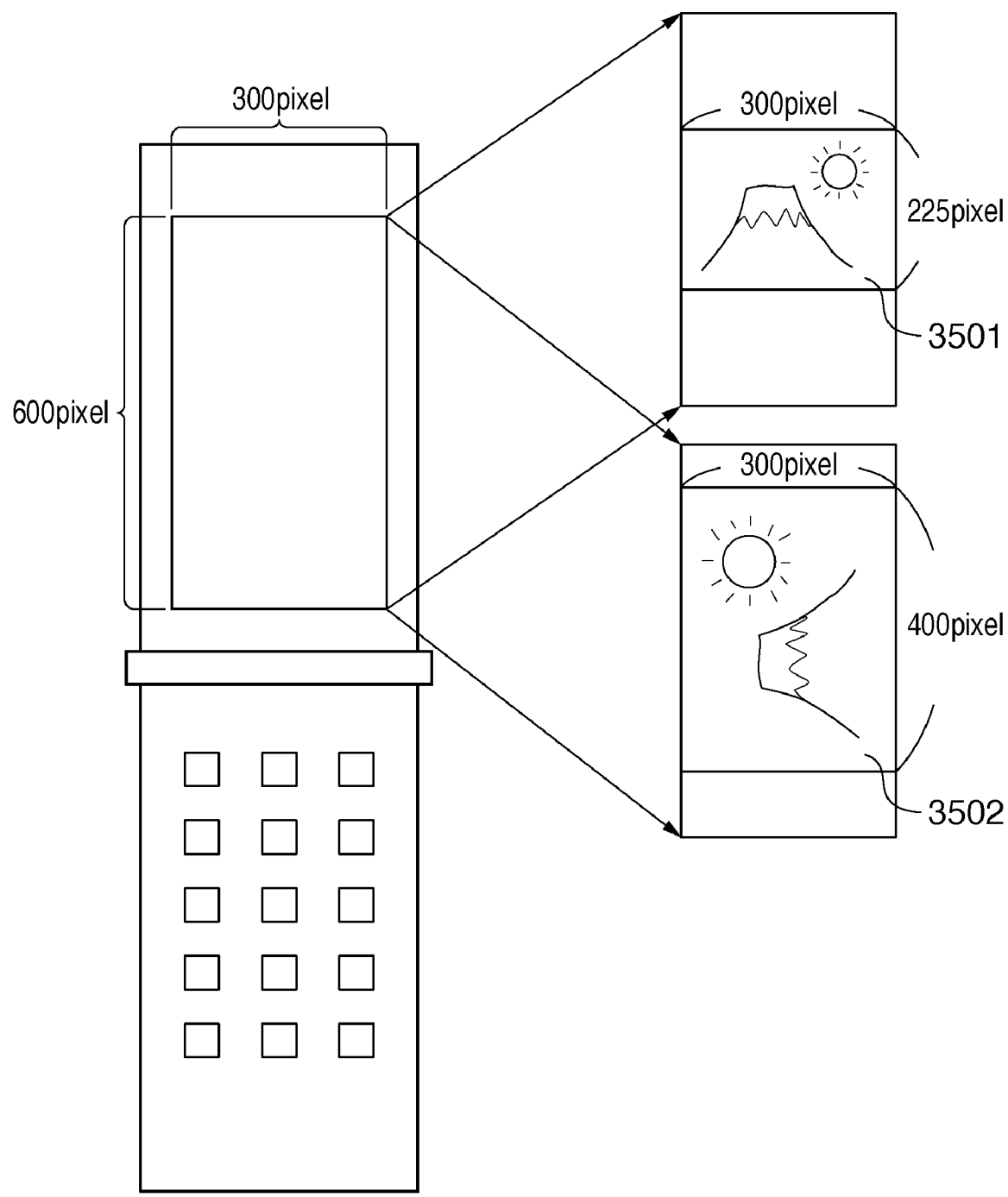
FIG. 32 is an explanatory view of a cellular phone according to the sixth embodiment.

Assume that a terminal connected to the server via a network is a cellular phone having a display screen with a resolution of 300×600 pixels, as shown in FIG. 32. The cellular phone is designed to raster-scan the display screen from the upper left to the lower right when held vertically. That is, when the user holds the cellular phone in the orientation shown in FIG. 32, image rotation is unnecessary. When the user holds the cellular phone that is rotated by 90°, image rotation is necessary. Note that the image size of the cellular phone and the main body orientation decided by the raster scanning direction are sent to the server when the cellular phone is connected to the server. In the following explanation, the orientation of the main body that is held to make raster scanning progress from the upper left to the lower right, i.e., the orientation of the cellular phone held vertically is defined as a "normal display direction". The orientation of the main body that is held to make raster scanning progress from the lower left to the upper right, i.e., the orientation of the cellular phone held horizontally is defined as a "rotation display direction". The processing procedure of the server according to the sixth embodiment will be described below with reference to the flowchart in FIG. 33.

FIG. 33 illustrates the processing procedure of an image distribution processing program executed by the CPU of the server. In the following description, "vertical direction" indicates the longitudinal direction of the display screen, and "horizontal direction" indicates the widthwise direction of the display screen. In the following description, the communication device (cellular phone in the embodiment) connected to the server is assumed to have already selected one of image files registered in the server. Also assume that resized image files coincident with the resolution of the display screen of the communication device (cellular phone in the embodiment) are not present.

The CPU of the server acquires, from the communication device (e.g., cellular phone) connected to the server, the main body information of the communication device (step S3601). The main body information includes the size of the display area of the display screen of the communication device and the orientation of the display screen.

Next, the CPU calculates the number of pixels necessary for the normal display direction (step S3602). This calculation will be described below. A ratio r1 of reducing the number of vertical pixels of the image to the number of vertical pixels of the display area of the display screen of the device is calculated. If an image whose horizontal size is reduced at the ratio fits into the display area, the image is resized using the ratio. On the other hand, if the image does not fit into the display area, a ratio r2 of reducing the number of horizontal pixels of the image to the number of horizontal pixels of the display area is calculated. The vertical size of the original image is also reduced using the ratio.

In the example of the sixth embodiment, the vertical ratio r1=600/3000=0.2. When the horizontal size of the image is reduced at that ratio, 4000×0.2=800 pixels. This is larger than 300 that is the number of horizontal pixels of the display area of the connected device (cellular phone). For this reason, the ratio r1 is unusable.

Next, the ratio r2=300/4000=0.075 is calculated. When the vertical size of the image is reduced at the ratio r2, 3000×0.075=225 pixels. This is smaller than 600 that is the number of vertical pixels of the display area of the connected device. Hence, r2 is decided as the use ratio. The CPU consequently decides to generate image data of 300×225 pixels as the image in the normal display direction (see reference numeral 3501 in FIG. 32).

Subsequently, the process advances to step S3603 to calculate the number of pixels of the largest image necessary for the rotation display direction. This is obtained as 400×300 pixels by the same calculation as that for the normal display direction (see reference numeral 3502 in FIG. 32).

After the end of size calculation, resizing is performed to generate the image in the normal display direction (step S3604). Next, resizing is performed to generate the image in the rotation display direction, and the obtained resized image is rotated (step S3605). The two resized images are encoded (step S3606). The encoding processing is the same as in the already described embodiments, and a description thereof will not be repeated. At this time, information representing which image is the normal display direction image or rotation display direction image is stored in the header, thereby generating and storing one file (step S3607). After that, the generated file is transmitted to the request source device (cellular phone) in step S3608.

The display processing method after reception on the cellular phone side is almost the same as in the fifth embodiment, and a description thereof will not be repeated.

As described above, according to the sixth embodiment, the server side compresses two, rotated and unrotated images, puts them together into one file, and stores it. This allows the cellular phone that has received the file to smoothly display an image regardless of the presence/absence of rotation of the main body.

In the second embodiment, it is assumed that encoded image data to be re-encoded is stored in a folder, but the present invention is not limited to the type of the storage and to type of the file format in which the encoded image data is stored. The present invention also incorporates a method of, e.g., searching in a format such as PDF which can store a plurality of kinds of encoded image data in one file and re-encoding the data as needed.

The present invention also incorporates a method of, if a set of encoded image data includes an unrotated image, rotating the image as needed and displaying it.

The above explanation has been made assuming that two encoded image data make a set. However, the present invention also incorporates a case in which three or more encoded image data make a set.

In the embodiments, a method of putting two code streams together into one file has been described. However, the present invention also incorporates storing two code streams in separate files and holding management information representing that the two files make a set.

Processing corresponding to the above embodiments may be implemented by a computer program to be executed by a computer. The computer program is normally stored in a computer-readable storage medium such as a CD-ROM. Setting the storage medium in the read unit (e.g., CD-ROM drive) of a computer and copying or installing the program in the system makes the computer executable. The present invention incorporates the computer-readable storage medium as well, as a matter of course.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-238391, filed Sep. 17, 2008, which is hereby incorporated by reference herein in its entirety.

What is claimed is:

1. An image encoding apparatus for encoding image data, comprising:
    a hierarchical encoder operable to encode image data and to generate encoded data having a hierarchical structure for generating N images having different resolutions from each other;
    an input unit operable to input original image data as first encoding target image data;
    a reduction unit operable to reduce the input original image data to generate second encoding target image data having a resolution lower than a resolution of the input original image data;
    a control unit operable to cause said hierarchical encoder to encode the first encoding target image data and the second encoding target image data in order to generate encoded data having a hierarchical structure for generating 2*N images having different resolutions from each other; and
    an output unit operable to output, as encoded data of the original image data input by said input unit, a set of the encoded data generated from the first encoding target image data by said hierarchical encoder and the encoded data generated from the second encoding target image data by said hierarchical encoder.

2. The apparatus according to claim 1, wherein said hierarchical encoder is operable to define a region including a plurality of pixels as a block, a region including a plurality of blocks as a macro block, and a region including a plurality of macro blocks as a tile, and to generate encoded data of each macro block by processing the block as a minimum unit, and to generate encoded data of each tile by arranging the encoded data of the macro blocks in a preset order,
    said hierarchical encoder comprising:
    a frequency converter operable to frequency-convert given data of each block to obtain one DC component data and a plurality of AC component data from each block;
    a block overlap processing unit operable to filter data in a region across a boundary between adjacent blocks to suppress discontinuity of data at the boundary;
    a deciding unit operable to set, as an arrangement format of the encoded data of a tile, one of a resolution sequence code stream format of arranging the encoded data sequentially from a low frequency to a high frequency of each macro block in said tile and a spatial sequence code stream format of arranging the encoded data for each macro block;

a setting unit operable to set the number of times of execution of said block overlap processing unit;

a quantizer operable to quantize each component data obtained by said frequency converter;

an entropy encoder operable to entropy-encode each component data quantized by said quantizer;

a code stream generator operable to arrange, in accordance with the arrangement format decided by said deciding unit, the encoded data in a tile of interest generated by said entropy encoder and to output the encoded data; and a controller adapted to operate said frequency converter twice and said block overlap processing unit as many times as the number of times set by said setting unit.

3. The apparatus according to claim 2, further comprising a unit operable to set whether to perform reduction processing of said reduction unit.

4. The apparatus according to claim 2, further comprising:
a determiner operable to analyze an encoded image data file and to determine whether the encoded image data file stores the encoded data of the reduced image data; and
a decoder operable to decode the original image data if said determiner determines that the encoded image data file does not store the encoded data of the reduced image data,
wherein said input unit is operable to input the original image data decoded by said decoder.

5. The apparatus according to claim 2, wherein a reduction ratio of said reduction unit is ¾.

6. The apparatus according to claim 2, further comprising:
an acquisition unit operable to acquire, from a decoding apparatus, information representing a resolution of an output device included in the decoding apparatus; and
a unit operable to decide a reduction ratio of said reduction unit based on the resolution of the original image data and the resolution of the output device of the decoding apparatus.

7. The apparatus according to claim 2, wherein said reduction unit is operable to generate reduced image data having resolutions ½ and ¾ of the resolution of the original image data.

8. An image decoding apparatus for decoding encoded image data of a file generated by an image encoding apparatus of claim 1 and outputting the image data to an output area of an output device, the image decoding apparatus comprising:
a discriminator operable to analyze the file and to discriminate types of resolutions directly decodable from encoded data of original image data and encoded data of reduced image data;
a determiner operable to determine, based on a discrimination result of said discriminator, which one of the encoded data of the original image data and the encoded data of the reduced image data enables direct decoding of image data having a minimum resolution not less than a resolution of the output area, and a code stream as a decoding process target;
a decoder operable to decode the code stream specified by a result of determination of said determiner; and
a resizing unit operable to resize, in accordance with the resolution of the output area, image data obtained upon decoding by said decoder.

9. A method of controlling an image encoding apparatus for encoding image data, the method comprising the steps of:
a hierarchical encoding step of encoding image data and to generate encoded data having a hierarchical structure for generating N images having different resolutions from each other;
inputting original image data as first encoding target image data;
reducing the input original image data to generate second encoding target image data having a resolution lower than a resolution of the input original image data;
a control step of causing the hierarchical encoding step to encode the first encoding target image data and the second encoding target image data in order to generate encoded data having a hierarchical structure for generating 2*N images having different resolutions from each other; and
outputting, as encoded data of the original image data input by said input unit a set of the encoded data generated from the first encoding target image data by the hierarchical encoding step encoded data generated from the second encoding target image data by said hierarchical encoding step.

10. The method according to claim 9, wherein the step of hierarchical encoding step further comprises:
defining a region including a plurality of pixels as a block,
defining a region including a plurality of blocks as a macro block,
defining a region including a plurality of macro blocks as a tile,
generating encoded data of each macro block by processing the block as a minimum unit,
generating encoded data of each tile by arranging the encoded data of the macro blocks in a preset order,
frequency-converting given data of each block to obtain one DC component data and a plurality of AC component data from each block;
filtering data in a region across a boundary between adjacent blocks to suppress discontinuity of data at the boundary;
setting, as an arrangement format of the encoded data of a tile, one of a resolution sequence code stream format of arranging the encoded data sequentially from a low frequency to a high frequency of each macro block in said tile and a spatial sequence code stream format of arranging the encoded data for each macro block;
setting the number of times of execution of the data filtering step;
quantizing each component data obtained in the frequency-converting step;
entropy-encoding each component data quantized in the quantizing step;
arranging, in accordance with the arrangement format decided in the step of setting the arrangement format, the encoded data in a tile of interest generated in the entropy-encoding step and outputting the encoded data; and
executing the frequency-converting step twice and the step of filtering the data as many times as the number of times set in the step of setting the number of times of execution of the data filtering step.

11. A method of controlling an image decoding apparatus for decoding encoded image data of a file generated by an image encoding apparatus of claim 1 and outputting the image data to an output area of an output device, the method comprising the steps of:

analyzing the file and discriminating types of resolutions directly decodable from encoded data of original image data and encoded data of reduced image data;

determining, based on a discrimination result in the step of analyzing the file and discriminating the types of the resolutions, which one of the encoded data of the original image data and the encoded data of the reduced image data enables direct decoding of image data having a minimum resolution not less than a resolution of the output area, and a code stream as a decoding process target;

decoding the code stream specified by a result of determination in the determining step; and resizing, in accordance with a resolution of the output area, image data obtained upon decoding in the decoding step.

12. A non-transitory computer-readable storage medium storing a computer program which causes a computer to function as an image encoding apparatus of claim 1 when read out and executed by the computer.

13. A non-transitory computer-readable storage medium storing a computer program which causes a computer to function as an image decoding apparatus of claim 8 when read out and executed by the computer.

* * * * *